(12) United States Patent
Park et al.

(10) Patent No.: US 10,619,732 B2
(45) Date of Patent: Apr. 14, 2020

(54) AUTOMOTIVE TRANSMISSION

(71) Applicant: SL Corporation, Daegu (KR)

(72) Inventors: Jeongho Park, Daegu (KR); Mose Kim, Daegu (KR)

(73) Assignee: SL Corporation, Daegu (KR)

(*) Notice: Subject to any disclaimer, the term of this patent is extended or adjusted under 35 U.S.C. 154(b) by 913 days.

(21) Appl. No.: 14/981,411

(22) Filed: Dec. 28, 2015

(65) Prior Publication Data

US 2016/0186858 A1 Jun. 30, 2016

(30) Foreign Application Priority Data

| Dec. 26, 2014 | (KR) | 10-2014-0190215 |
| Dec. 30, 2014 | (KR) | 10-2014-0194460 |
| Jun. 30, 2015 | (KR) | 10-2015-0093544 |
| Sep. 18, 2015 | (KR) | 10-2015-0132554 |

(51) Int. Cl.

| F16H 61/24 | (2006.01) |
| F16H 59/04 | (2006.01) |
| F16H 59/10 | (2006.01) |
| H02K 41/035 | (2006.01) |
| F16H 59/02 | (2006.01) |

(52) U.S. Cl.
CPC ........... *F16H 61/24* (2013.01); *F16H 59/044* (2013.01); *F16H 59/105* (2013.01); *H02K 41/0356* (2013.01); *F16H 2059/026* (2013.01); *F16H 2061/241* (2013.01)

(58) Field of Classification Search
CPC ...... F16H 59/044; F16H 59/105; F16H 61/24; F16H 2061/241; H02K 41/0356

USPC ........... 403/372; 384/202; 74/473.12, 473.3, 74/473.33
See application file for complete search history.

(56) References Cited

U.S. PATENT DOCUMENTS 3,033,624 A * 5/1962 Biesecker ............... F16C 11/04
174/153 G
5,155,399 A * 10/1992 Zimmermann ....... H01F 7/1615
310/23

(Continued)

FOREIGN PATENT DOCUMENTS

| KR | 10-2005-0018502 A | 2/2005 |
| KR | 101338085 B1 | 12/2013 |
| KR | 20140057056 A | 5/2014 |

*Primary Examiner* — William C Joyce
(74) *Attorney, Agent, or Firm* — Nelson Mullins Riley & Scarborough LLP; Kongsik Kim, Esq.

(57) ABSTRACT

An automotive transmission, having a reduced weight and size improves a driver's manipulating feel in gear shifting, prevents shifting failure, and improves durability. The automotive transmission includes a housing, a knob manipulated by a driver, a lever that moves in linkage with the operation of the knob, and a linear drive motor that provides a reaction force. The linear drive motor includes a rear component disposed in the housing, a head component movably installed with respect to the rear component, a magnet disposed in the head component or the rear component and a coil disposed in the other component. The head component includes a sidewall having a portion that overlaps the rear component, and a cover that extends from one end of the sidewall to an interior side of the head component and a thickness greater than the thickness of the sidewall.

19 Claims, 29 Drawing Sheets

(56) References Cited

U.S. PATENT DOCUMENTS

| | | | | |
|---|---|---|---|---|
| 5,317,221 A | * | 5/1994 | Kubo | H02K 41/0356 310/12.16 |
| 6,194,796 B1 | * | 2/2001 | Yeakley | H02K 41/0356 310/12.16 |
| 7,279,814 B2 | * | 10/2007 | Patt | H02K 33/18 310/12.16 |
| 7,675,202 B1 | * | 3/2010 | Huang | H02K 41/0356 310/13 |
| 8,415,838 B1 | * | 4/2013 | Eghbal | H02K 33/16 310/12.16 |
| 2002/0020236 A1 | * | 2/2002 | Onodera | F16H 59/105 74/335 |
| 2009/0229396 A1 | * | 9/2009 | Taylor | B64C 13/04 74/471 XY |
| 2010/0301694 A1 | | 12/2010 | Spaggiari | |
| 2011/0056318 A1 | * | 3/2011 | Rake | F16H 59/0278 74/473.12 |
| 2012/0025633 A1 | | 2/2012 | Lee et al. | |
| 2013/0313838 A1 | * | 11/2013 | Sakamoto | F03G 7/08 290/1 R |

* cited by examiner

AUTOMOTIVE TRANSMISSION

CROSS-REFERENCE TO RELATED APPLICATION

This application claims priority from Korean Patent Application No. 10-2014-0190215 filed on Dec. 26, 2014, Korean Patent Application No. 10-2014-0194460 filed on Dec. 30, 2014, Korean Patent Application No. 10-2015-0093544 filed on Jun. 30, 2015, and Korean Patent Application No. 10-2015-0132554 filed on Sep. 18, 2015. The applications are herein incorporated by reference.

TECHNICAL FIELD

The present invention relates to an automotive transmission, and more particularly, to an automotive transmission, by which a driver selects a gear position.

RELATED ART

Generally, to implement variable vehicle speeds from low speed shifting to high speed shifting using an engine having an revolution per minute (rpm) in a given range, vehicles are typically equipped with a transmission to adjust the rotational speeds of wheels while varying a gear ratio in an engine rpm. Additionally, an automotive transmission has a function of reversely transmitting an output of the engine to allow the vehicle to be driven in reverse.

A driver selects a gear position by manipulating (e.g., actuating) a knob disposed (e.g., positioned or installed) proximate to the driver to adjust the gear ratio. The transmission is generally either a manual transmission or an automatic transmission. In the manual transmission, a driver selects a gear position, such as a first gear, a second gear, a third gear, a fourth gear, etc., according to the moving speed of a vehicle. In the automatic transmission, an engine control unit (ECU) of a vehicle automatically controls a gear position of the vehicle according to the moving speed of the vehicle, engine load, and opening extent of a throttle valve.

Generally, the automatic transmission includes gear positions having a P range to park or stop the operation of the vehicle, a D range to engage forward movement of the vehicle, an R range to engage the reverse movement of the vehicle, and an N range for restricting an engine output from being transmitted to driving wheels of the vehicle. For example, the driver may select each gear range using a knob, which is generally a lever type or a dial type. Certain vehicles may be equipped with a transmission having gear positions in forms of buttons. In particular, a shift lever has a series of gear ranges arranged in the order of Park-Reverse-Neutral-Drive (P-R-N-D) and allows the driver to select each gear by linearly translating (e.g., moving) the shift lever. Recently, transmissions are provided with a knob of a lever type that is tilted in place and returned by the driver's manipulation, rather than being fixed in gear positions of the P-R-N-D shift arrangement. Accordingly, a gear position is selected sequentially by varying the P-R-N-D shift arrangement based on the direction that the lever is tilted.

Furthermore, a knob having a dial type selects a gear position by arranging P-R-N-D gears around a dial rotating within a predetermined angle range and placing a particular point of the dial at each gear position. The transmission equipped with a knob of a lever type or a dial type transmits a shift manipulation feel in a tactile manner to allow the driver to recognize that the gear position has been adjusted (e.g., changed) or the knob is positioned at each gear position when the driver selects a gear position in the P-R-N-D gear arrangement. In other words, to implement a shift manipulation feel, the transmission is provided with a shifter detent device. However, the conventional shifter detent device implementing a shift manipulation feel using a mechanical configuration, may require a complicated structure.

Additionally, for safe operation of a vehicle, shifting from a D range to a P range or an R range, or shifting from a P range or an R range to a D range should be accomplished when the vehicle is nearly stopped. In other words, a separate shift blocking device is provided in the conventional transmission to disable gear shifting by allowing gear shifting only when certain conditions are satisfied while preventing the knob from moving in other cases.

The above information disclosed in this section is merely for enhancement of understanding of the background of the invention and therefore it may contain information that does not form the prior art that is already known in this country to a person of ordinary skill in the art.

SUMMARY

The present invention provides an automotive transmission, which can be made lighter in weight and smaller in size. An automotive transmission, may improve a driver's manipulating feel in gear shifting by increasing a propulsive force of a shifting lever, thereby preventing a shifting failure. Accordingly, an automotive transmission may have improved durability. Additionally, the automotive transmission may generate a constant propulsive force of a linear drive motor when a driver selects a gear position indoors.

In one aspect of an exemplary embodiment, an automotive transmission may include a housing, a knob manipulated by a driver, a lever that moves (e.g., translates) in conjunction (e.g., linkage) with the operation of the knob, and a linear drive motor configured to provide a reaction force against a force required to move (e.g., displace) the knob or a force required for the driver to manipulate (e.g., actuate) the knob. The linear drive motor may include a rear component fixedly disposed within the housing and a head component may be movably disposed with respect to the rear component. Further a magnet may be disposed within one of the head component or the rear component. A coil may be disposed within the other of the head component and the rear component. Additionally, the head component may include a sidewall having at least a portion that overlaps the rear component, and a cover that extends from one end of the sidewall to an interior side of the head component and may have a first cover unit with a thickness greater than a thickness of the sidewall.

The first cover unit may have a thickness of about two times or greater than the thickness of the sidewall. A thickness ratio of the first cover unit and the sidewall may be about 3:1. The cover may further include a second cover unit that extends from the first cover unit to an interior side of the head component and may have a thickness that is greater than the thickness of the first cover unit. A first surface of the second cover unit may be coplanar with a first surface of the first cover unit. Further, a second surface of the second cover unit may be stepped with respect to a second surface of the first cover unit and may protrude parallel to the sidewall. The rear component may include a bobbin that has the coil wound thereon. The bobbin may include a base plate coupled to the housing and a coil cylinder that extends from one surface of the base plate and has the coil wound thereon.

A plurality of recesses may be formed on the second surface of the base plate and may be recessed toward the first surface of the base plate.

In some exemplary embodiments, the head component may be configured to move toward the rear component until the movement of the head component is restricted and the coil may be spaced a predetermined distance from the first cover unit. The predetermined distance between the coil and the first cover unit may be within a range of about 1 mm to about 2 mm. In other exemplary embodiments, the lever may include a pivoting component rotatably supported within the housing, a knob coupling component that extends from the pivoting component to one side and coupled to the knob, and an extension component that extends from the pivoting component to the opposite (e.g., other or alternate) side may have at least a portion curved.

The automotive transmission may further include a link member that has a first end coupled to the extension component to be rotatable and a second end coupled to the head component, and moves linearly with the head component and rotates the lever around the pivoting component. The extension component may include a penetration aperture having a link pivot shaft coupled to an end of the link member. The automotive transmission may further include an elastic member interposed between the penetration aperture and the link pivot shaft.

The linear drive motor may include a first yoke disposed at a first end of the magnet and may have a first thickness, and a second yoke disposed at a second end of the magnet and may have a second thickness greater than the first thickness. The first yoke and the second yoke may be concentrically arranged around the magnet. The magnet may have an asymmetric magnetization distribution in which a polarity of one of an N pole and an S pole, may be formed adjacent to the second yoke, and may have a wider polar distribution than that of the other pole formed adjacent to the first yoke. The asymmetric magnetization distribution of the magnet may increase a propulsive force of the head component the polarity formed to be adjacent to the second yoke may generate an electromagnetic force that may be greater than the electromagnetic force generated by the polarity formed adjacent to the first yoke.

In other exemplary embodiments, a width of at least a region between opposite (e.g., opposing) surfaces of the magnet may be less than a width between the opposite surfaces. Widths of the magnet may be constantly maintained from the opposite surfaces of the magnet to a middle portion of the magnet to then decrease in the form of a line or a curve. The widths of the magnet may be constantly maintained from the opposite surfaces of the magnet to a middle portion of the magnet and the width of the middle portion may be constantly maintained. The widths of the magnet may decrease from the opposite surfaces of the magnet to a middle portion of the magnet in the form of a line or a curve.

As described above, exemplary embodiments may provide an automotive transmission that may be made have a reduced weight and size. Additionally, the automotive transmission may improve a driver's tactile control (e.g., manipulating feel) when gear shifting by increasing a propulsive force of a shifting lever, thereby reducing a shifting failure. Further, the automotive transmission may have improved durability and may generate a constant propulsive force from a linear drive motor when a driver selects a gear position.

BRIEF DESCRIPTION OF THE DRAWINGS

The above and other features and advantages of the present invention will become more apparent by describing in detail preferred exemplary embodiments thereof with reference to the attached drawings in which.

DETAILED DESCRIPTION

Figure 1:
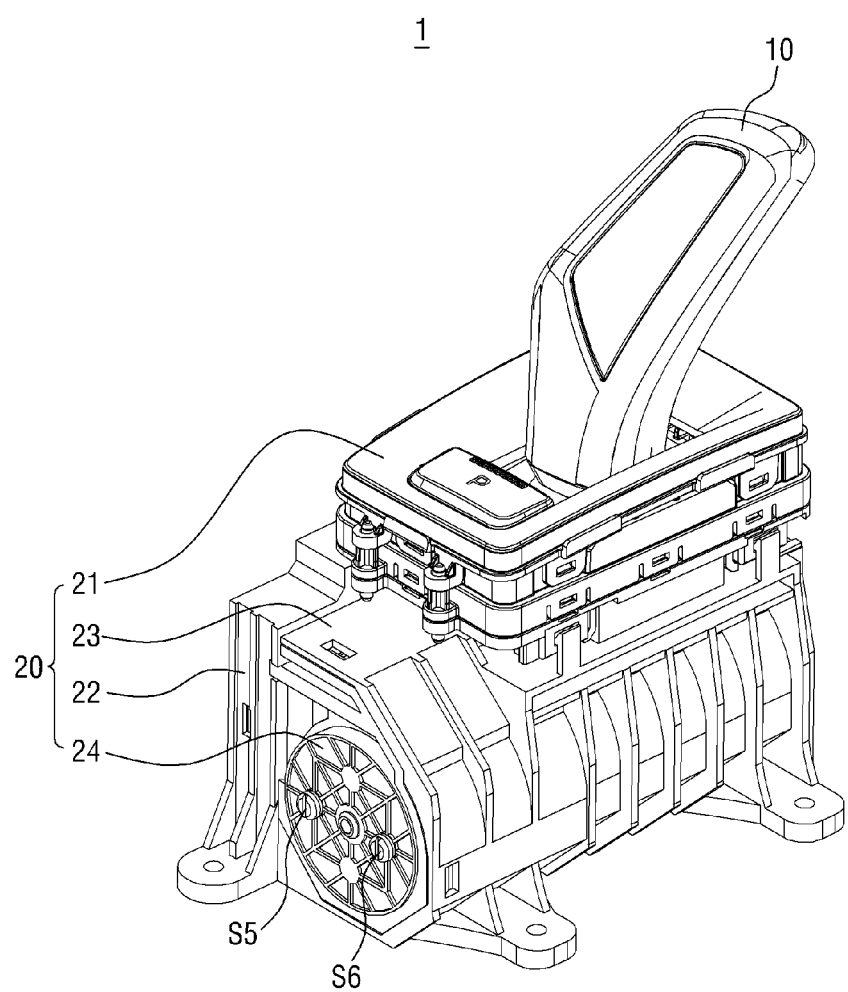
FIG. 1 is an exemplary perspective view of an automotive transmission according to an exemplary embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Embodiments described herein will be described referring to plan views and/or cross-sectional views by way of ideal schematic views of the invention. Accordingly, the exemplary views may be modified depending on manufacturing technologies and/or tolerances. In the drawings, the thickness of layers and regions are exaggerated or abridged for clarity.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 is an exemplary perspective view of an automotive transmission according to an exemplary embodiment of the present invention. As shown in FIG. 1, the automotive transmission 1 may include a knob 10 that protrude upwardly, an upper housing 21 disposed beneath (e.g., under) the knob 10 and surrounds the knob 10, a first side housing 22 coupled to a bottom portion of a first side of the upper housing 21, and a second side housing 23 coupled to a bottom portion of a second side of the upper housing 21. The knob 10 and the upper housing 21 may be disposed to be exposed to an interior of the vehicle between the center fascia and the center console box within the interior of the vehicle. The first side housing 22 and the second side housing 23 positioned beneath (e.g., under) the upper housing 21 may be disposed within a compartment that extends from the center fascia to the center console box without being exposed to the interior of the vehicle. The knob 10 may be manipulated by the driver and may be actuated (e.g., moved forward or rearward) to select a gear position in a P-R-N-D order. In a transmission that supports a manual shift mode, the knob 10 may be moved to the left or to the right to then be moved forward or rearward to select a gear position of a first gear, a second gear, a third gear, a fourth gear, etc.

As shown in FIG. 1, a button P for parking may be formed in the upper housing 21. The parking button P of the upper housing 21 may be an operational button of an electric parking brake (EPB). Alternatively, the parking button P of the upper housing 21 may be a button for setting a gear position in a P range. In other words, the gear position may be selected by the knob 10 in an R-N-D order. As shown in FIG. 1, an internal housing 24 that defines a rear side of the transmission 1 may be disposed between the first side housing 22 and the second side housing 23. The internal housing 24 may be coupled to a bobbin (850 of FIG. 7) of a linear drive motor (80 of FIG. 2) disposed within the internal housing 24. As shown in FIG. 1, the internal housing 24 may be coupled to the bobbin 850 through screws S5 and S6.

Figure 2:
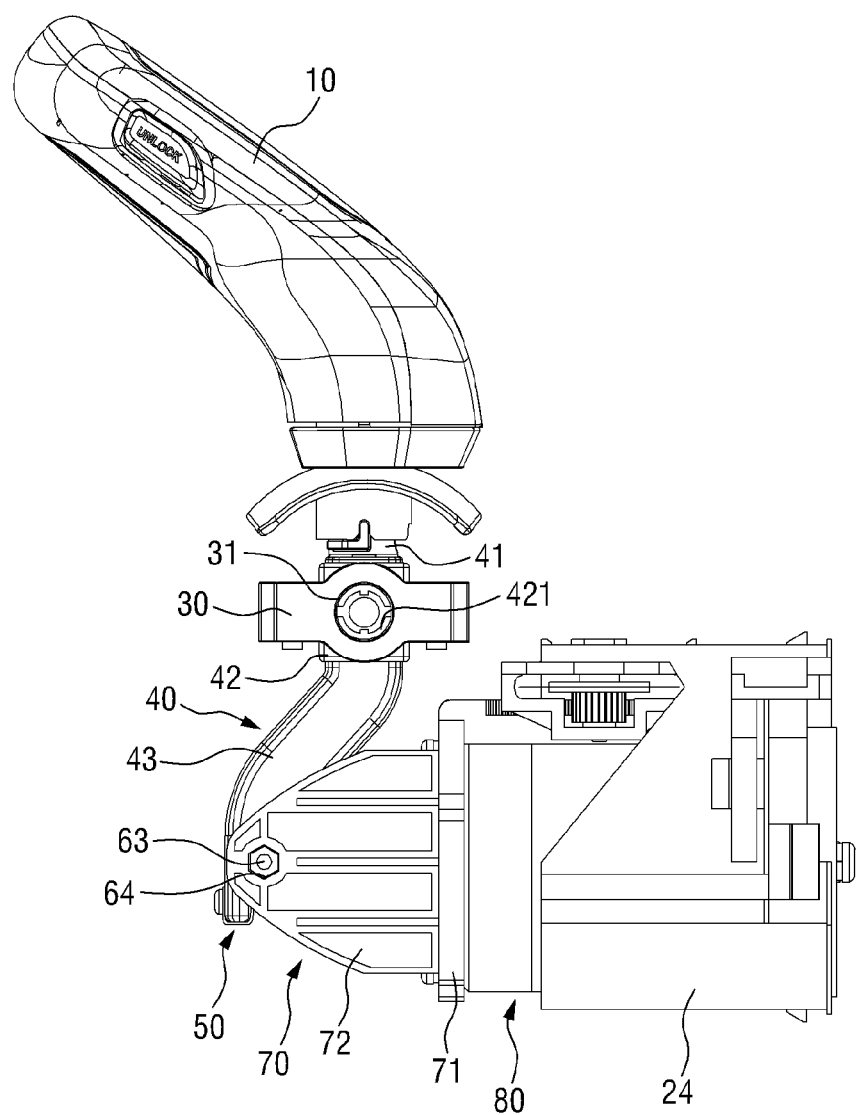
FIG. 2 is an exemplary side view illustrating an external housing of the automotive transmission according to an exemplary embodiment of the present invention.

FIG. 2 shows an exemplary side view that illustrates an external housing of the automotive transmission according to an embodiment of the present invention is removed. The internal structure of the automotive transmission 1 is shown in FIG. 2. In other words, the lever 40 may support the knob 10, a lever holder 30 may rotatably support the lever 40, a link member 70 may be coupled to the lever 40 to be relatively rotatable and a linear drive motor 80 may be coupled to the internal housing 24 disposed within the external housings 21, 22 and 23. Among the aforementioned components, the lever 40 will first be described.

Figure 3:
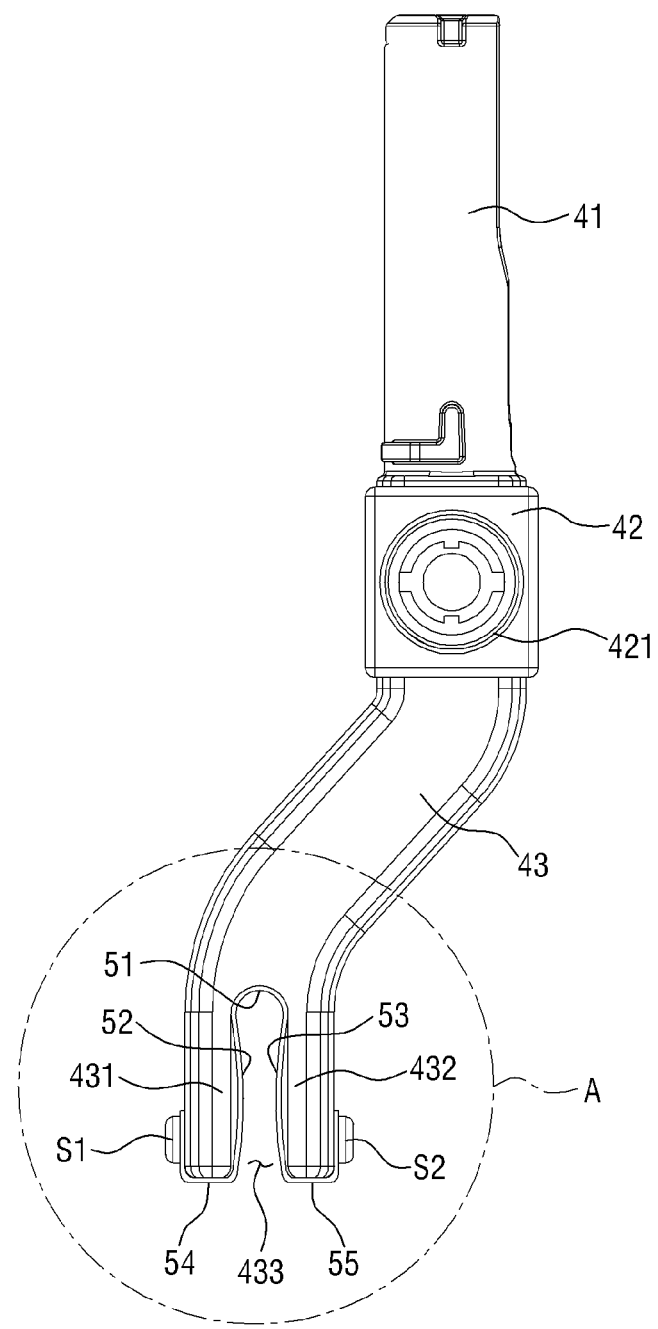
FIG. 3 is an exemplary side view illustrating a lever and an elastic member of the automotive transmission according to an exemplary embodiment of the present invention.

FIG. 3 shows an exemplary side view illustrating a lever and an elastic member of the automotive transmission according to an exemplary embodiment. As shown in FIGS. 2 and 3, the lever 40 may include a pivoting component 42 rotatably coupled to lever holder 30, a knob coupling component 41 that extends from the pivoting component 42 to a first side, and an extension component 43 that extends from the pivoting component 42 to a second side.

As shown in FIG. 3, the knob coupling component 41 may extend from an upper (e.g., top) end of the pivoting component 42 in a substantially linear manner. Additionally, as shown in FIG. 2, the knob coupling component 41 may be inserted into the knob 10 to be coupled to the knob 10. The pivoting component 42 may include a lever pivot shaft 421 that protrudes from a lateral surface of the pivoting component 42. The lever pivot shaft 421 may be inserted into a holder penetration aperture 31 formed within the lever holder 30 to rotatably couple the pivoting component 42 to the lever holder 30. The lever holder 30 may be fixedly disposed within one of the external housings 21, 22 and 23 to restrict the lever 40 to perform a rotational operation with respect to the lever pivot shaft 421.

As shown in FIG. 3, the extension component 43 may be formed to extend from a lower (e.g., bottom) end of the pivoting component 42 in a substantially 'S'-shaped form. Therefore, the lever 40 may have a vertically asymmetrical shape about the pivoting component 42. Further a portion of the extension component 43 may be positioned farther forward than the knob coupling component 41. In particular, the arrangement of the extension component 43 and the link member 70 may transfer an output of the linear drive motor 80 to the lever 40 between the lever 40. The linear drive motor 80 may be positioned beneath (e.g., under) the pivoting component 42, and may cause a reduction of a front-back length of the transmission 1. The reduction of the front-back length of the transmission 1 may make the transmission 1 compact. For example, a space between the center fascia and the center console box may be reduced and may improve space utilization efficiency of the transmission 1. In particular, the remaining space produced may be attributed to the compact structure of the transmission 1 may be y used to install components for further enhancement and convenience of the vehicle.

As shown in FIG. 3, a penetration aperture 433 may be formed at a bottom end of the extension component 43 and may include a first installation unit 431 and a second installation unit 432 that extends toward opposite sides. An elastic member 50 may be disposed within each of the penetration aperture 433, the first installation unit 431 and the second installation unit 432.

Figure 4:
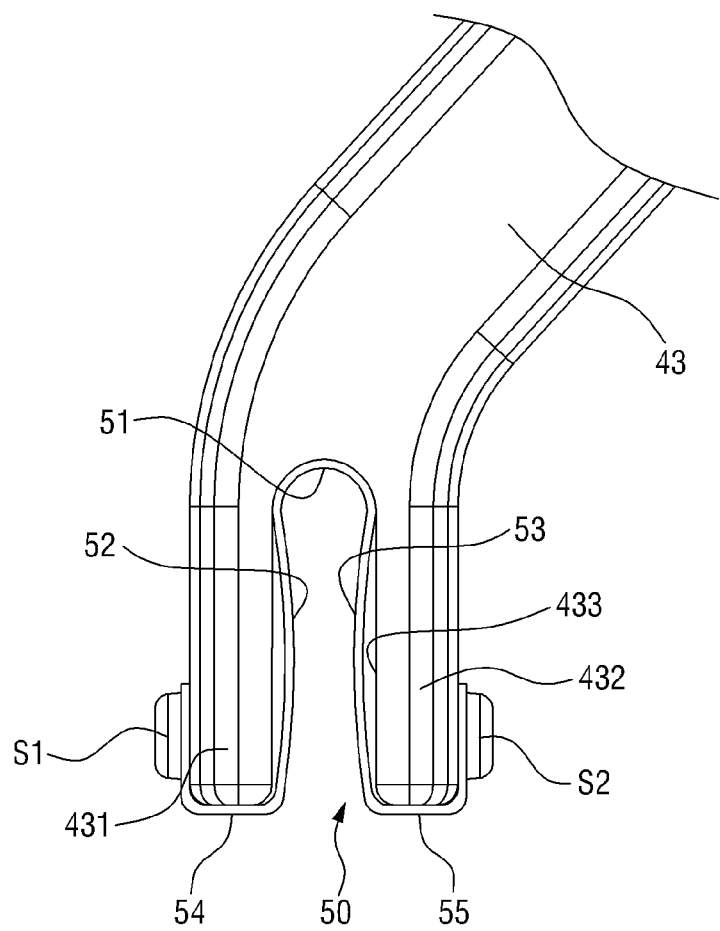
FIG. 4 is an exemplary enlarged view illustrating a portion 'A' of FIG. 3.

FIG. 4 is an exemplary enlarged view illustrating a portion 'A' of FIG. 3. As shown in FIG. 4, the elastic member 50 may have a substantially 'Ω'-shaped configuration. The elastic member 50 may include a first elastic component 51 positioned proximate to the penetration aperture 433, fixing components 54 and 55 fixedly installed in the first installation unit 431 and the second installation unit 432, and second elastic components 52 and 53 that connects the first elastic component 51 with the fixing components 54 and 55. The second elastic parts 52 and 53 may include a first elastic support component 52 that extends from a first end of the first elastic component 51 and a second elastic component 53 that extends from a second end of the first elastic component 51.

The fixing components 54 and 55 may include a first fixing component 54 and a second fixing component 55 coupled to the first installation unit 431 and the second installation unit 432, respectively. The first fixing component 54 may extend from the first elastic support component 52 and may be formed to surround the first installation unit 431 from the interior of the penetration aperture 433. Additionally, the first fixing component 54 may be coupled to the first installation unit 431 by a screw S1 that may enter from the exterior of the first installation unit 431, in other words, from the opposite side of the penetration aperture 433. The second fixing component 55 may extend from the second elastic component 53 and may be formed to surround the second installation unit 432 from the interior of the penetration aperture 433. Further, the second fixing component 55 may be coupled to the second installation unit 432 by a screw S2 that may enter from the exterior of the second installation unit 432, in other words, from the opposite side of the penetration aperture 433.

The first fixing component 54 may be coupled to the first installation unit 431 by pressing the first elastic component 51 and the first elastic support component 52 toward the interior of the penetration aperture 433. For example, as shown in FIG. 4, the first elastic component 51 may be elastically deformed to be pressed and positioned proximate to the penetration aperture 433 to have a shape that corresponds to the top end of the penetration aperture 433, and the first elastic support component 52 51 may be elastically deformed to be substantially shaped in the form of an arc convexly toward the interior of the penetration aperture 433 spaced apart from the penetration aperture 433. Additionally, the second fixing component 55 may be coupled (e.g., fixed) to the second installation unit 432 by pressing the first elastic component 51 and the second elastic component 53 toward the interior of the penetration aperture 433. In particular, as shown in FIG. 4, the first elastic component 51 may be elastically deformed to be pressed and position proximate to (e.g., brought into close contact with) the penetration aperture 433 to have a shape that substantially corresponds to the top end of the penetration aperture 433. The second elastic component 53 may be elastically deformed to be substantially shaped in the form of an arc convexly toward the interior of the penetration aperture 433 to be spaced apart from the penetration aperture 433.

In an exemplary embodiment, the second end of the penetration aperture 433 may be opened, but aspects of the present invention are not limited thereto. The penetration aperture 433 may be include the ends of the first installation unit 431 and the second installation unit 432 merged into one body, so that the penetration aperture 433 may have a substantially circular or elliptical shape. In other words, shapes of the fixing components 54 and 55 may be changed to correspond to the circular or elliptical penetration aperture 433.

Figure 5:
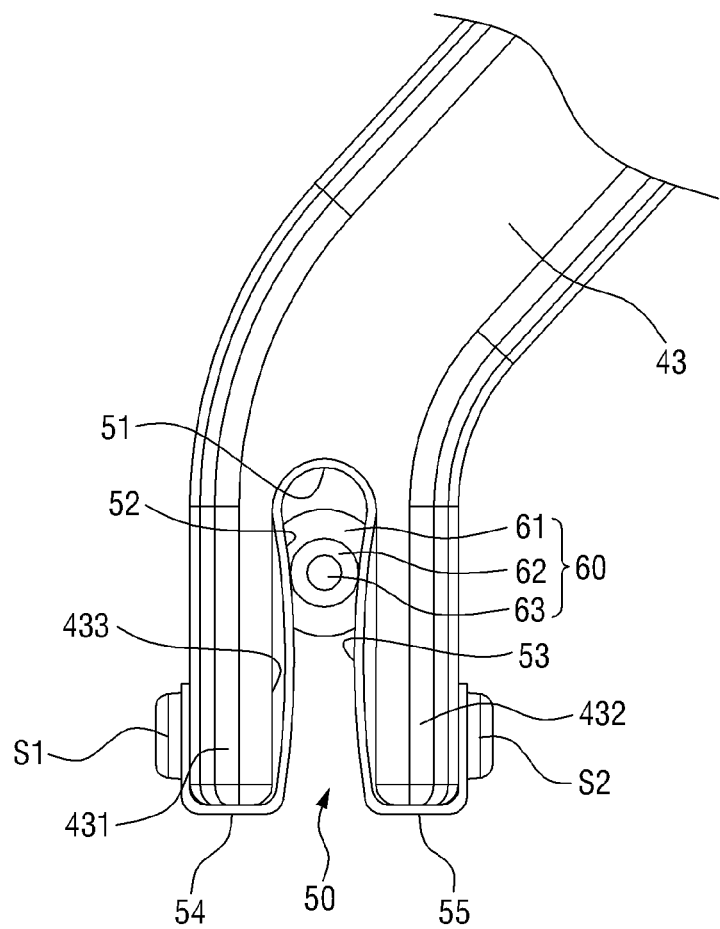
FIG. 5 is an exemplary view illustrating a link pivot shaft elastically supported by the elastic member shown in FIG. 4.

FIG. 5 is an exemplary view illustrating a state in which a link pivot shaft elastically supported by the elastic member shown in FIG. 4. A link pivot shaft 60 according to an exemplary embodiment may couple the lever (40 of FIG. 2) and the link member (70 of FIG. 2) to each other to be rotatable. As shown in FIG. 5, the link pivot shaft 60 may pass through the penetration aperture 433 and may be fastened by the first elastic support component 52 and the second elastic component 53 in the penetration aperture 433. In particular, the link pivot shaft 60 may include a pivot shaft head 61, a shaft body 62 and a nut coupling unit 63. The pivot shaft head 61 may have a diameter that is greater than the penetration aperture 433 to serve to rotate the nut coupling unit 63 when the nut (64 of FIG. 2) is assembled with the nut coupling unit 63 while serving as a stopper for making the shaft body 62 retain in the penetration aperture 433. Further, a substantially crisscross, linear or hexagonal tool coupling groove (not shown) to be coupled to a screwdriver or a drill, may be formed at the opposite side of the pivot shaft head 61, although not shown in FIG. 5. The shaft body 62 may extend from the pivot shaft head 61 and may have a substantially cylindrical shape and has a first end elastically supported by the first elastic support component 52 and the second end elastically supported by the second elastic component 53, as shown in FIG. 5.

At least a portion of the nut coupling unit 63 may be exposed to the exterior of the penetration aperture 433 and may have a diameter that is less than the shaft body 62. One end of the link member 70 may be rotatably coupled to a portion of the nut coupling unit 63, positioned adjacent to the shaft body 62. A thread that corresponds to a thread of a nut (64 of FIG. 2) may be formed at an exterior side of an end of the nut coupling unit 63, which is spaced apart from the shaft body 62. The nut 64 may be coupled to the end of the nut coupling unit 63, and may prevent the link member 70 from being disassembled. During the lifetime of the vehicle, the knob 10 may be repeatedly manipulated tens of thousands to hundreds of thousands of times. When the elastic member 50 is not provided, the shaft body 62 and the penetration aperture 433 are brought into direct contact with each other according to the manipulation of the knob 10 and are relatively rotated with respect to each other, resulting in abrasion. The abrasion may create a gap between the shaft body 62 and the penetration aperture 433.

However, according to an exemplary embodiment, the elastic member 50 may be interposed between the penetration aperture 433 and the shaft body 62, and may prevent friction from occurring between the shaft body 62 and the penetration aperture 433. Furthermore, since the second elastic components 52 and 53 of the elastic member 50 elastically support the shaft body 62, a gap may be prevented from being created between the second elastic components 52 and 53 and the shaft body 62 even when the shaft body 62 is gradually abraded. Therefore, even after the repeated manipulation of the knob 10 tens of thousands to hundreds of thousands of times, the knob 10 may have enhanced durability, thereby achieving secured torque transfer between the lever 40 and the link member 70.

Figure 6:
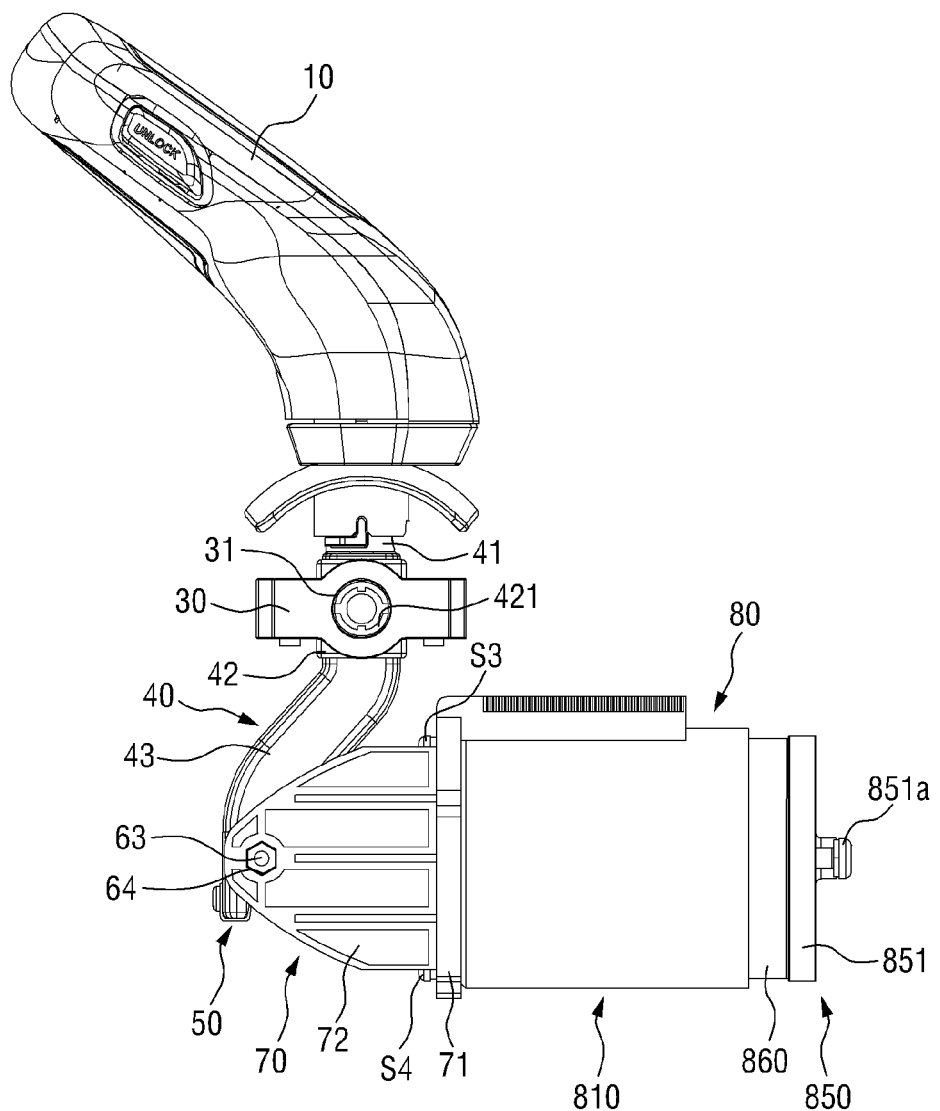
FIG. 6 is an exemplary side view illustrating an internal housing removed from the automotive transmission shown in FIG. 2.

FIG. 6 is an exemplary side view illustrating an internal housing removed from the automotive transmission shown in FIG. 2. As shown in FIG. 6, the automotive transmission 1 may include the link member 70 coupled to the lever 40 to be relatively rotatable and the linear drive motor 80 may have a portion coupled to the link member 70 and other portions coupled to the internal housing (24 of FIG. 2). The portion of the linear drive motor 80 coupled to the link member 70 are a head component 810 and the portions coupled to the internal housing 24 are a rear components 850 and 860. The link member 70 may include a flange 71 and a pair of coupling sets 72 that extend from one surface of the flange 71 to the penetration aperture 433 of the lever 40.

The pair of coupling sets 72 may be formed to be spaced apart from each other by a distance that corresponds to a thickness of the lever 40. While only one of the pair of coupling sets 72 is illustrated in FIG. 6, another pair of coupling sets (not shown), which are the same with the coupling sets 72, are provided in the rear of the lever 40, when viewed in FIG. 6. As described above, the pair of coupling sets 72 shown in FIG. 6 may be assembled with the nut coupling unit 63 to be coupled by the nut 64, and may prevent the pair of coupling sets 72 from being disassembled by the nut 64. For example, the pair of coupling sets (not shown) may be assembled to be positioned between the pivot shaft head 61 of the link pivot shaft 60 and the lever 40 to be coupled by the pivot shaft head 61, and may thereby prevent the pair of coupling sets (not shown) from being disassembled by the pivot shaft head 61.

The head component 810 of the linear drive motor 80 may be disposed on a reverse surface of the flange 71. The head component 810 and the flange 71 may be coupled to each other by screws S3 and S4 or other fastening components. The rear components 850 and 860 of the linear drive motor 80 may be coupled to the fixedly installed internal housing (24 of FIG. 2). The head component 810 may be installed to be movable within a given distance range in a linear direction (in the left-right direction in FIG. 6) from the rear components 850 and 860 fixed with the internal housing 24.

Therefore, when the driver manipulates the knob 10, the lever 40 may be rotated about the pivoting component 42 and the link member 70 and the head component 810 linearly move accordingly. Conversely, when the head component 810 linearly moves, the link member 70 linearly moves together with the head component 810, so that the lever 40 and the knob 10 are rotated.

Figure 7:
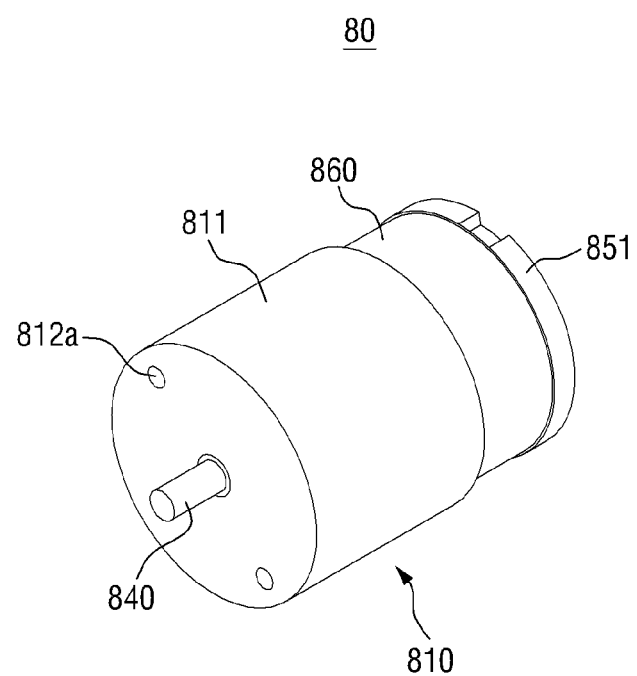
FIG. 7 is an exemplary perspective view of a linear drive motor of the automotive transmission according to an exemplary embodiment of the present invention.
Figure 8:
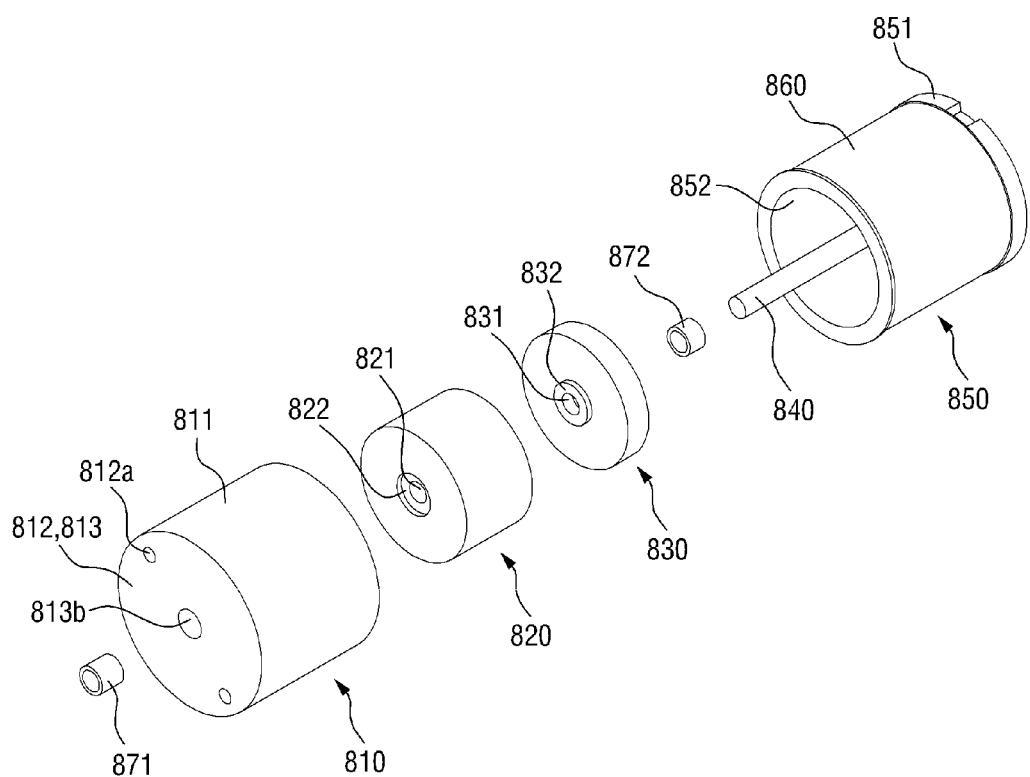
FIG. 8 is an exemplary exploded perspective view of a linear drive motor of the automotive transmission according to an exemplary embodiment of the present invention.
Figure 9:
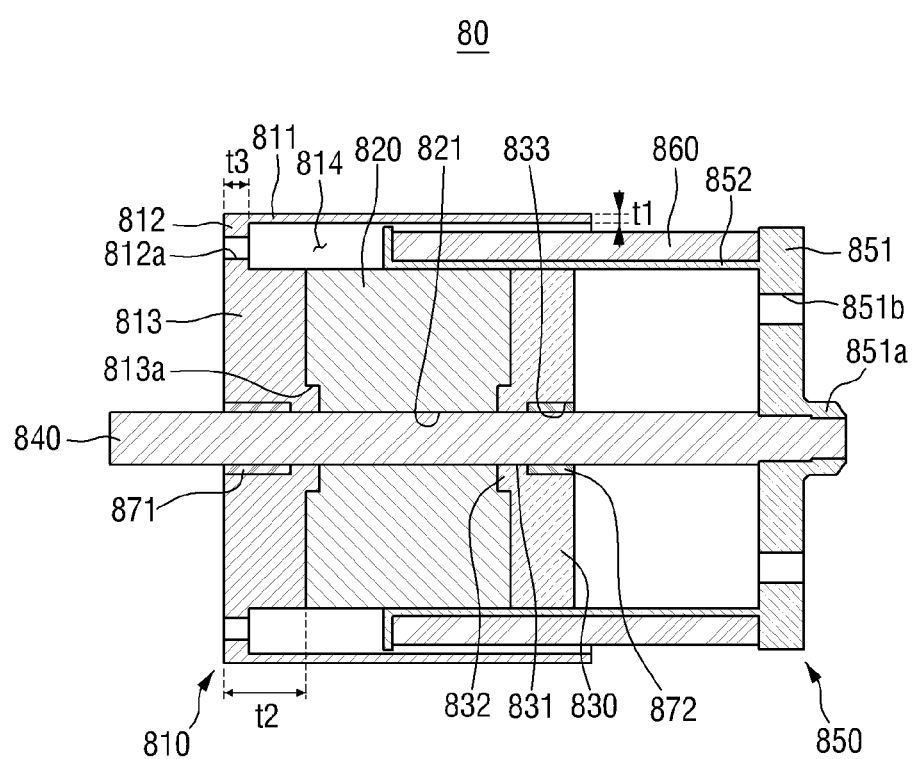
FIGS. 9 to 11 are exemplary cross-sectional views sequentially illustrating states in which the linear drive motor shown in FIG. 8 is operated according to shifting of the automotive transmission according to an exemplary embodiment of the present invention.
Figure 10:
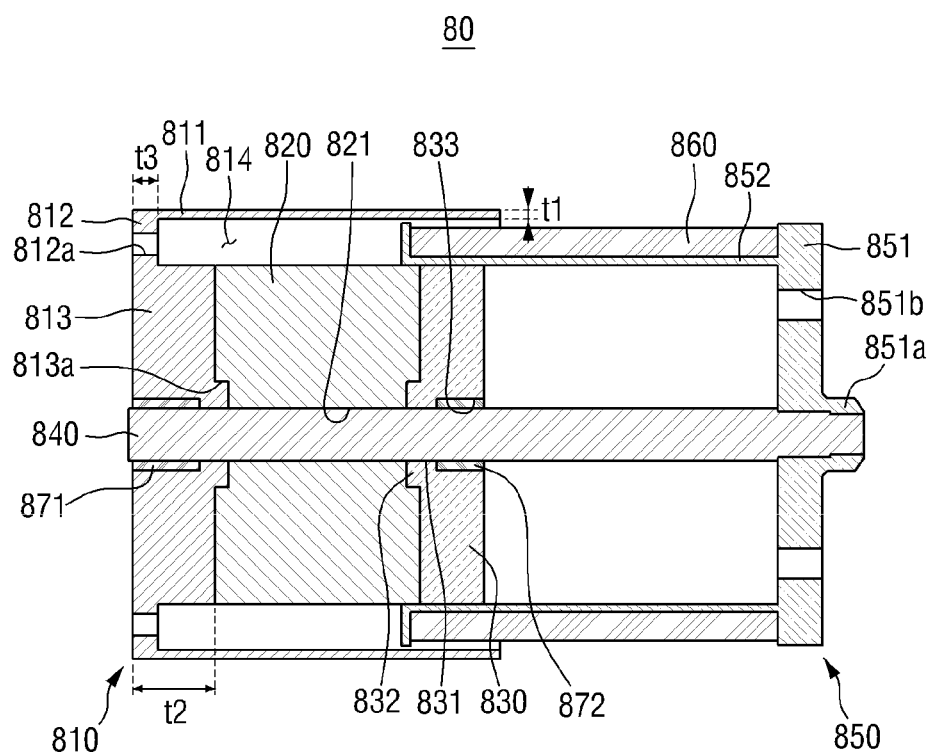
Figure 11:
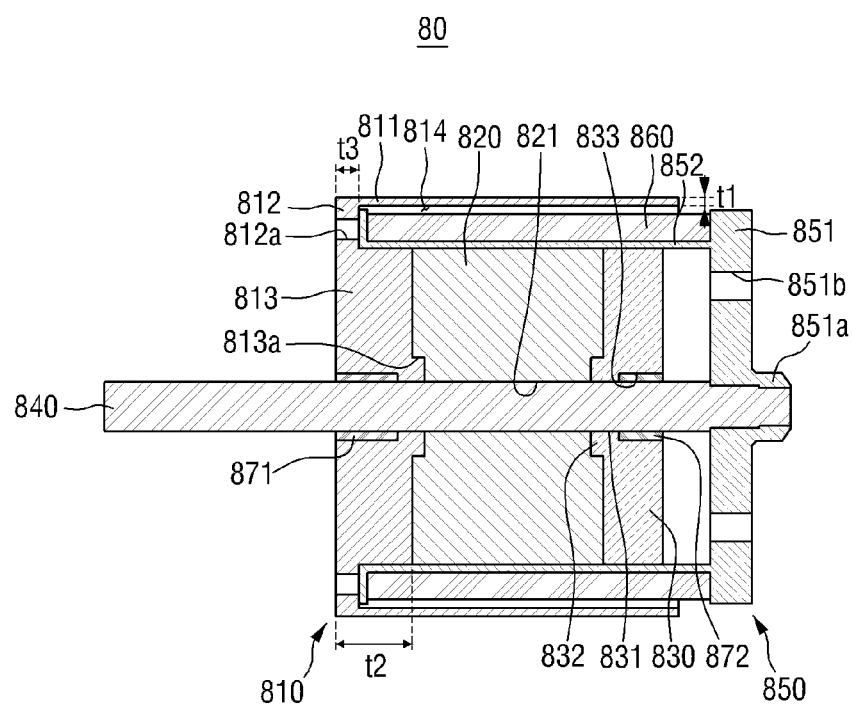
Figure 12:
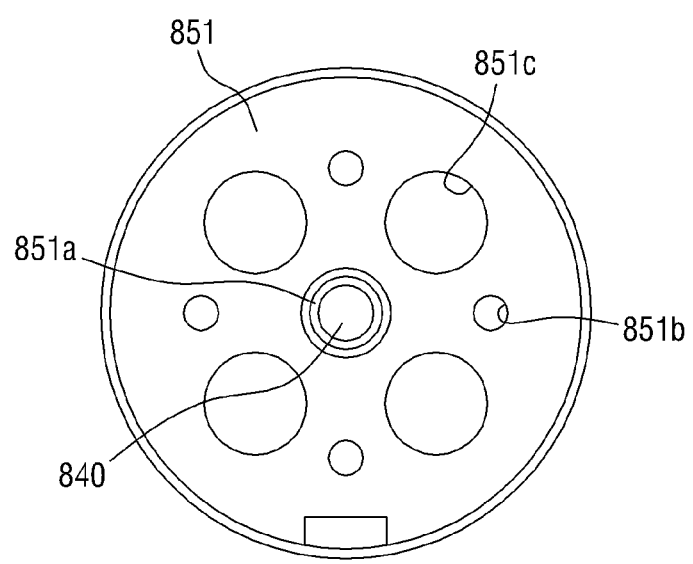
FIG. 12 is an exemplary rear view of the linear drive motor of the automotive transmission according to an exemplary embodiment of the present invention.

Hereinafter, the linear drive motor 80 of the automotive transmission 1 according to an exemplary embodiment will be described in more detail. FIG. 7 is an exemplary perspective view of a linear drive motor of the automotive transmission according to an exemplary embodiment of the present invention. FIG. 8 is an exemplary exploded perspective view of a linear drive motor of the automotive transmission according to an exemplary embodiment of the present invention. FIGS. 9 to 11 are exemplary cross-sectional views sequentially illustrating states in which the linear drive motor shown in FIG. 8 may be operated according to shifting of the automotive transmission according to an exemplary embodiment of the present invention. FIG. 12 shows an exemplary rear view of the linear drive motor of the automotive transmission according to an exemplary embodiment of the present invention.

As shown in FIGS. 8 and 9, the linear drive motor 80 may include a head component 810, a magnet 820, a yoke 830, a motor shaft 840, a bobbin 850, a coil 860 and bushes 871 and 872. The linear drive motor 80 may be driven to linearly move (e.g., displace) the head component 810 while the magnet 820 may be moved (e.g., displaced) by a magnetic field formed by a change in the current applied to the coil 860.

As shown in FIG. 9, the motor shaft 840 may contain a central axis of the linear drive motor 80 and may have a first end exposed to the front of the head component 810 and a second end fixed to a motor shaft accommodating unit 851a formed in a base plate 851 of the bobbin 850. The first end of the motor shaft 840 exposed to the front of the head component 810 may pass through the flange 71 of the link member 70. The motor shaft 840 may guide the movement (e.g., directional displacement) of the head component 810 that move relative to the rear components 850 and 860, the magnet 820, the yoke 830 and the link member 70. The bobbin 850 and the coil 860 may define rear components of the linear drive motor 80. The bobbin 850 may include the base plate 851 coupled to the internal housing (24 of FIG. 2) and a coil cylinder 852 that extends from one surface of the base plate 851. As described above, the motor shaft accommodating unit 851a may couple the second end of the motor shaft 840 formed at the center of the base plate 851. As shown in FIG. 9, the motor shaft accommodating unit 851a may be formed to protrude on the second surface of the base plate 851 so as to expose a portion of the second end of the motor shaft 840.

As shown in FIG. 12, screw holes 851b, into which screws (S5 and S6 of FIG. 1) for fixing the internal housing 24 and the base plate 851 are inserted, may be formed in the second surface of the base plate 851. Additionally, a plurality of recesses 851c may be formed between the motor shaft accommodating unit 851a and the screw holes 851b in the second surface of the base plate 851b. The plurality of recesses 851c may be formed to be recessed to be stepped with respect to the first surface of the base plate 851 or may be formed to pass through the second surface of the base plate 851. The plurality of recesses 851c may be provided to reduce the weight of the linear drive motor 80.

As shown in FIG. 9, the coil cylinder 852 may be formed to extend while being stepped with respect to the base plate 851. The coil 860 may be wound on the exterior surface of the coil cylinder 852. The coil cylinder 852 may have a hollow interior space, that may create an accommodation or movement a space of the motor shaft 840 and the magnet 820 and the yoke 830 installed in the head component 810.

As shown in FIGS. 7 to 9, the head component 810 may include a sidewall 811 that has at least a portion that surrounds the exterior side of the coil 860, and covers 812 and 813 sustainably obstructing (e.g., closing) one end of the sidewall 811.

As shown in FIG. 9, the covers 812 and 813 may include a first cover unit 812 and a second cover unit 813. The first cover unit 812 may be formed to extend from the one end of the sidewall 811 to be substantially perpendicular to the sidewall 811, and may define peripheral portions of the covers 812 and 813. The second cover unit 813 may be formed to extend from the first cover unit 812 to the interior, and may define central portions of the covers 812 and 813. As shown in FIG. 9, the second cover unit 813 may have a diameter that corresponds to a diameter of the magnet 820. As shown in FIG. 9, the second cover unit 813 may be formed to have thickness greater than the thickness of the first cover unit 812. A thickness t3 of the first cover unit 812 corresponds to a width ranging between a portion of the other surface of each of the covers 812 and 813, which define a space 814 to be described later, and one surface of each of the covers 812 and 813. Additionally, a thickness t2 of the second cover unit 813 corresponds to a width that ranges between a portion of the other surface of each of the covers 812 and 813, the portion being in contact with the magnet 820, and one surface of each of the covers 812 and 813.

According to an exemplary embodiment, the first surface of the head component 810 may be coupled to the second surface of the link member 70, the first surface of the first cover unit 812 and the first surface of the second cover unit 813 are substantially coplanar with each other. The second surface of the second cover unit 813 may be formed to protrude substantially parallel with the sidewall 811 and forms a stepped portion with respect to the second surface of the first cover unit 812. Therefore, the second cover unit 813 may be thicker than the first cover unit 812 by a thickness of the stepped portion. The covers 812 and 813 may directly transfer a propulsive force generated when the magnet 820 is moved by a magnetic force or kept in place to the link member 70. The propulsive force may be proportional to weights of the covers 812 and 813 as well as the magnetic force applied between the magnet 820 and the coil 860. However, when the diameters or thicknesses of the covers 812 and 813 are increased for to increase the propulsive force, the overall size of the linear drive motor 80 may undesirably increase.

Therefore, according to an exemplary embodiment, the second cover unit 813 that directly transfers the propulsive force generated by the magnet 820 when the linear drive motor 80 and the magnet 820 are brought into direct contact with each other may be formed relatively thickly to increase the weight of the second cover unit 813, thereby increasing the propulsive force. Furthermore, the first cover unit 812 that connects the second cover unit 813 and the sidewall 811 may be formed relatively thinly to reduce the weight of the covers 812 and 813 thereby reducing the weight of the linear drive motor 80. Screw holes 812a, into which the screws S3 and S4 to engage the link member 70 are inserted, may be formed in the first cover unit 812. A first shaft aperture 813b through which the motor shaft 840 passes may be formed in the second cover unit 813. An inner diameter of the first shaft aperture 813b may be greater than an exterior diameter of the motor shaft 840, and a first bush 871 may be interposed between the first shaft aperture 813b and the motor shaft 840.

The first bush 871 may prevent the first shaft aperture 813b and the motor shaft 840 from directly contacting each other and may allow the head component 810 to smoothly move along the motor shaft 840. A first assembling unit 813a that protrudes around the first shaft aperture 813b may be formed on the second surface of the second cover unit 813. The first assembling unit 813a may be combined with a second assembling unit 822 of the magnet 820 in a fit interference manner, thereby facilitating a tight assembling work of the second cover unit 813 and the magnet 820. The aforementioned head component 810 may be made of S45C carbon steel, permalloy, an amorphous metal alloy, an oriented electromagnetic steel sheet, a non-oriented electromagnetic steel sheet, pure iron, or the like, to effectively transfer the magnetic force between the magnet 820 and the coil 860.

As shown in FIGS. 8 and 9, the magnet 820 may be disposed on the second surface of the second cover unit 813. The magnet 820 may be a ferromagnetic material, such as neodymium. The magnet 820 may move linearly along the motor shaft 840 in response to the magnetic field generated by a change in the current applied to the coil 860 of the rear components 850 and 860 or may retain in place. The second shaft aperture 821 through which the motor shaft 840 passes may be formed at the center of the magnet 820. The second assembling unit 822 recessed around the second shaft aperture 821 may be formed on a first surface of the magnet 820 to correspond to the first assembling unit 813a. The first assembling unit 813a may be formed to protrude and the second assembling unit 822 may be formed to be recessed are shown in FIGS. 8 and 9, but aspects of the present invention are not limited to the types illustrated herein. Alternatively, the first assembling unit 813a may be formed to be recessed and the second assembling unit 822 may be formed to protrude. An undefined third assembling unit may be formed to be recessed around the second shaft aperture 821 in the other surface of the magnet 820.

Furthermore, as shown in FIGS. 8 and 9, the yoke 830 may be disposed on the second surface of the magnet 820. The yoke 830 may minimize unnecessary leakage of magnetic fluxes and forms a magnetic flux distribution of the magnetic field between the magnet 820 and the coil 860 to be substantially perpendicular to the magnet 820 and the coil 860. A third shaft aperture 831 through which the motor shaft 840 passes may be formed at the center of the yoke 830. A fourth assembling unit 832 that protrudes around the third shaft aperture 831 may be formed on a first surface of the yoke 830 to correspond to the third assembling unit. The third assembling unit may be formed to be recessed and the fourth assembling unit 832 may be formed to protrude are shown in FIGS. 8 and 9, but aspects of the present invention are not limited to the types illustrated herein. Alternatively, the third assembling unit may be formed to protrude and the fourth assembling unit 832 formed to be recessed.

A bush installation groove 833, may be formed by an increase in the inner diameter of the third shaft aperture 831, that may be formed in the second surface of the yoke 830. A second bush 872 may be interposed between the bush installation groove 833 and the motor shaft 840. Similarly to the first bush 871, the second bush 872 may prevent the yoke 830 and the motor shaft 840 from directly contacting each other and may allow the yoke 830 to smoothly move along the motor shaft 840. In the exemplary embodiment, the magnet 820 may be mounted in the head component 810 and the coil 860 may be mounted on the bobbin 850, provided merely for illustration. Conversely, the magnet 820 may be installed on the bobbin 850 and the coil 860 may be mounted on the head component 810.

As shown in FIG. 9, the second cover unit 813, the magnet 820 and the yoke 830 may be formed to have substantially the similar diameter to be maintained at a predetermined distance apart from the sidewall 811. Here, the coil 860 and the coil cylinder 852 may be positioned within the space 841 formed between each of the second cover unit 813, the magnet 820 and the yoke 830 and the sidewall 811. The coil 860 and the coil cylinder 852 may repeatedly advance and retreat within the space 814 as the head component 810, the magnet 820 and the yoke 830 slidably move along the motor shaft 840 altogether. A width of the space 814 may be equal to or similar to a width of the first cover unit 812 of the head component 810. Further, the linear drive motor 80 according to the exemplary embodiment, a ratio of a thickness t1 of the sidewall 811 to a thickness t3 of the first cover unit 812 may be about 1:3 (see FIG. 9). The thickness t1 of the sidewall 811 may be a width that ranges between the interior surface and the exterior surface of the sidewall 811 defining the space 814.

As described above, the thickness t2 of the second cover unit 813 may be relatively large and the thickness t3 of the first cover unit 812 may be relatively small, and thereby reduces the weight of the linear drive motor 80 while the propulsive force of the linear drive motor 80 may be increased. In particular, to determine the thickness t3 of the first cover unit 812 optimized for attaining the lightweight linear drive motor 80, various experiments were carried out. As the result, the maximum propulsive force was obtained when the thickness t3 of the first cover unit 812 is approximately three times greater than the thickness t1 of the sidewall 811.

Figure 13:
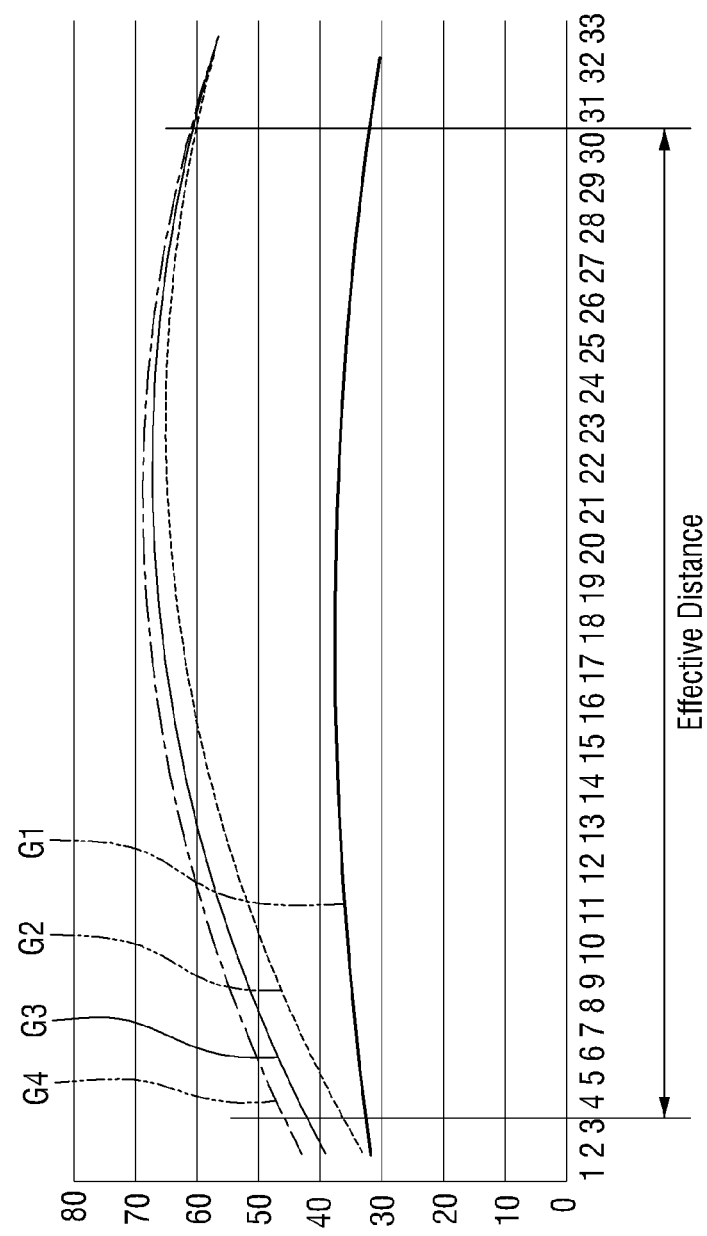
FIG. 13 is an exemplary graph comparatively illustrating a propulsive force of the linear drive motor of the automotive transmission according to an exemplary embodiment of the present invention with a propulsive force of a conventional linear drive motor.

FIG. 13 is an exemplary graph comparatively illustrating a propulsive force of the linear drive motor of the automotive transmission according to an exemplary embodiment with a propulsive force of a conventional linear drive motor. In the graphical representation of FIG. 13, the curve G1 represents a transition in the propulsive force of the conventional voice coil motor (VCM). The curve G2 represents a transition in the propulsive force of a modified linear drive motor that has a configuration similar to that of the linear drive motor 80 of the automotive transmission 1 according to an exemplary embodiment, in which the thickness t3 of the first cover unit 812 and the thickness t1 of the sidewall 811 may both be designed to be 1T.

Additionally, the curve G3 represents a transition in the propulsive force of a modified linear drive motor that may have a configuration similar to that of the linear drive motor 80 of the automotive transmission 1 according to an exemplary embodiment of the present invention, in which the thickness t3 of the first cover unit 812 may be designed to be 2T and the thickness t1 of the sidewall 811 may be designed to be 1T. The curve G4 represents a transition in the propulsive force of the linear drive motor 80 of the automotive transmission 1 according to an exemplary embodiment, in which the thickness t3 of the first cover unit 812 may be 3T and the thickness t1 of the sidewall 811 may be 1T. The curves G2, G3 and G4 were obtained from the experiments carried out using the linear drive motor 80 including the head component 810 made of S45C carbon steel.

As shown, since the propulsive force of the conventional VCM was less than 40N, the conventional VCM could not be actually applied to the automotive transmission (e.g., the curve G1). For example, when the driver attempts to shift a gear position from a D range to a P range or an R range or from a P range or an R range to a D range during driving of a vehicle, a reaction force for restricting the manipulation of the knob may be generated by blocking the shifting for safe driving of the vehicle. In order to securely achieve the requirement, the propulsive force output from the VCM may be 40N or greater. However, as shown in FIG. 13, the conventional VCM provides a propulsive force of less than 40N within the range of effective distance.

In the curve G2, the propulsive force of the linear drive motor 80 was higher than that of the conventional VCM, as represented by the curve G1. However, the propulsive force of less than 40N was demonstrated in a portion of the sections within the range of the effective distance. In the curves G3 and G4, the propulsive force of 40N or greater was demonstrated within the range of effective distance. However, the propulsive force represented by the curve G4 was significantly greater than that represented by the curve G3 in the short effective distance.

Furthermore, although not shown in FIG. 13, the thickness t3 of the first cover unit 812 was designed to be 4T and the thickness t1 of the sidewall 811 was designed to be 1T, the propulsive force showed a transition similar to that of the propulsive force represented by the curve G4. However, when the thickness t3 of the first cover unit 812 may be 4T, the weight of the linear drive motor 80 may be increased and the thicknesses of the covers 812 and 813 may be increased, making it difficult to achieve compactness and reduce the weight of the linear drive motor 80. Accordingly, the automotive transmission 1 according to an exemplary embodiment may adopt the case of the curve G4 as an ideal case.

In particular, in the case of the curve G4, since the propulsive force of 45N or greater may be demonstrated from the starting time of the effective distance, the automotive transmission 1 according to an exemplary embodiment of the present invention can actually implement shift blocking by providing the reaction force for restricting the manipulation of the knob 10 to prevent the knob 10 from being shifted from a particular gear position to another while the vehicle moves. Additionally, when necessary, the knob 10 may be forcibly displaced to increase driving stability of the vehicle. For example, when the driver stops the engine of the vehicle while the gear position is positioned in the D range or the R range, the linear drive motor 80 may shift a gear position to the P range by forcibly shifting the knob 10 to the P range. Additionally, when the driver shifts the gear position using the knob 10 by controlling the current applied to the coil 860, an appropriate reaction force against the force required for the driver to manipulate the knob 10 may be provided to control the propulsive force to provide a shift tactile movement to the driver during shifting.

As shown in FIGS. 9 to 11, the head component 810 of the linear drive motor 80 may move within a predetermined distance with respect to the rear components 850 and 860 by manipulating the knob 10. As described above, in the covers 812 and 813, the thickness t3 of the first cover unit 812 may be relatively small and the thickness t2 of the second cover unit 813 may be greater than the thickness t3 of the first cover unit 812. Therefore, an additional space for allowing movement of the coil 860 may be formed by an area that corresponds to a thickness difference (t2−t1) between the first cover unit 812 of the second cover unit 813.

Therefore, as shown in FIG. 11, when the head component 810 maximally overlaps with the rear components 850 and 860, an end of the coil 860 may be proximate to (e.g., brought into close contact) with the other surface of the first cover unit 812. In such a state as shown in FIG. 11, the coil 860 overlaps with the magnet 820 and a portion of the end of the coil 860 deviates from the portion that overlaps with the magnet 820 to then overlap with the second cover unit 813, and the coil 860 may be affected by a reverse magnetic flux density. The reverse magnetic flux density may be one of factors that decrease the propulsive force. Therefore, to reduce the affect the reverse magnetic flux density on the coil 860, various methods for increasing the propulsive force during the manipulation of the knob 10 were researched. As the result, it was confirmed from various experiments that when a range of the overlapping portion between the coil 860 and the second cover unit 813 may be adjusted, the effect of reverse magnetic flux density may be suppressed, which leads to an increase in the propulsive force.

Figure 14:
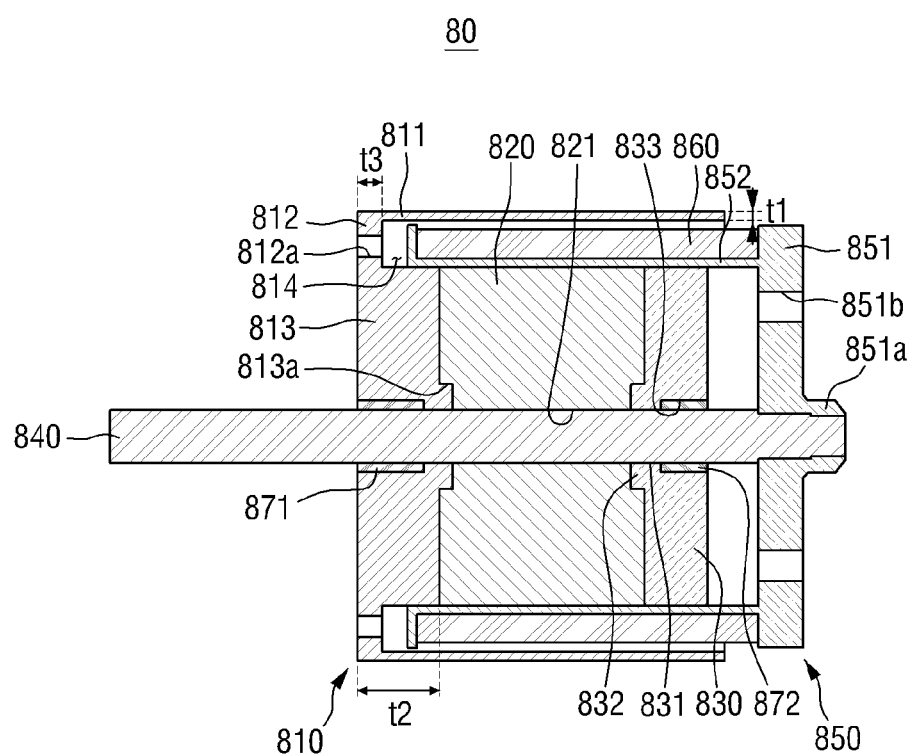
FIG. 14 is an exemplary cross-sectional view illustrating a length of a coil of the linear drive motor of the automotive transmission according to an exemplary embodiment of the present invention.

FIG. 14 shows an exemplary cross-sectional view illustrating a state in which a length of a coil of the linear drive motor of the automotive transmission according to an exemplary embodiment. As shown in FIG. 14, when the knob 10 is manipulated, the head component 810 may be moved toward the rear components 850 and 860 and the coil 860 overlaps with the length of the magnet 820. In other words, the end of the coil 860 may be spaced a predetermined distance apart from the other surface of the first cover unit 812, so that the portion of the coil 860 that overlaps with the second cover unit 813 may be reduced. As described above, in order to reduce the portion of the coil 860 that overlaps with the second cover unit 813, lengths of the coil 860 and the coil cylinder 852 on which the coil 860 may be wound are further reduced.

Figure 15:
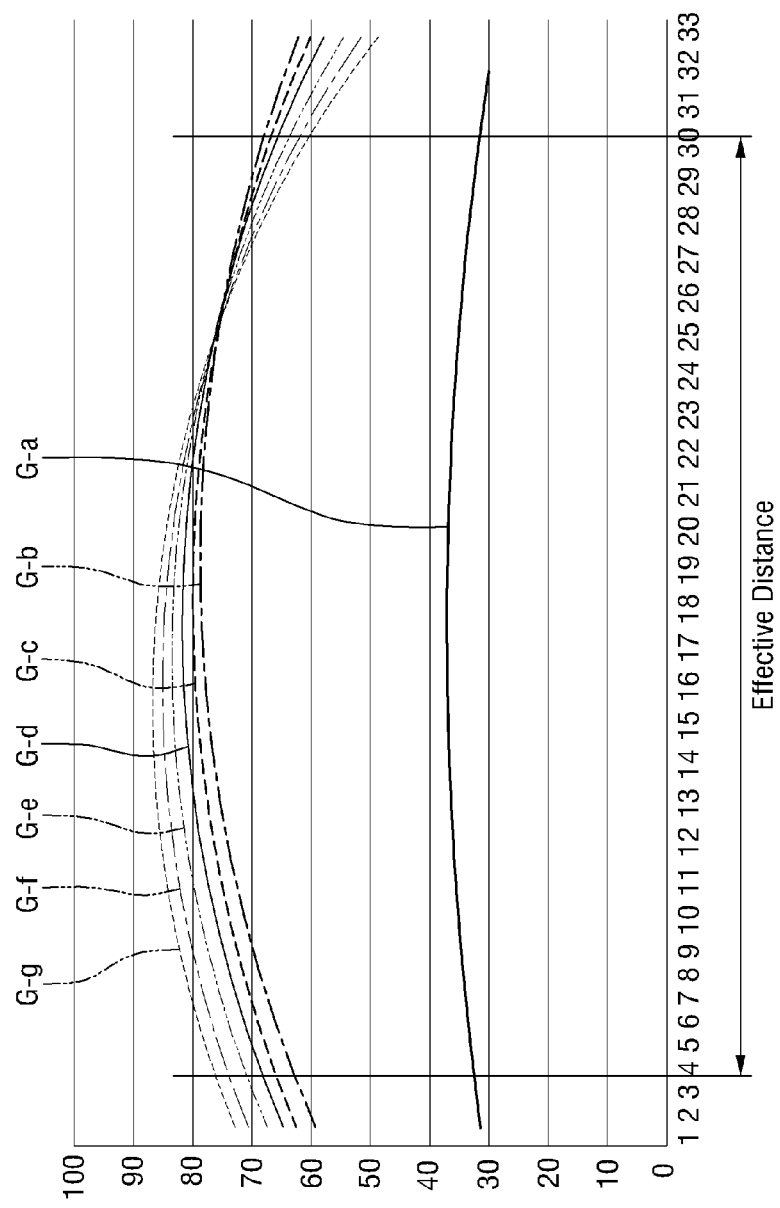
FIG. 15 is an exemplary graph illustrating a transition in the propulsive force while varying lengths of the coil of the linear drive motor of the automotive transmission according to an exemplary embodiment of the present invention.

In a state in which the head component 810 moves toward the rear components 850 and 860, the propulsive force was tested in various cases where the coil 860 was positioned proximate to (e.g., brought into close contact with) the other surface of the first cover unit 812, or when the coil 860 is made to be spaced the predetermined distance apart from the other surface of the first cover unit 812 by a gradual reduction in the length of the coil 860, and the results thereof are shown in FIG. 15.

FIG. 15 is an exemplary graph illustrating a transition in the propulsive force while varying lengths of the coil of the linear drive motor of the automotive transmission according to an exemplary embodiment. Referring to FIG. 15, the curve G-a represents a transition in the propulsive force of the VCM. The curve G-b represents a transition in the propulsive force of a modified linear drive motor that has a configuration the same with or similar to that of the linear drive motor 80 applied to the automotive transmission 1 according to an exemplary embodiment. The end of the coil 860 may be designed to be positioned proximate to (e.g., brought into close contact with) the other surface of the first cover unit 812. Additionally, the curve G-c represents a transition in the propulsive force of a modified linear drive motor that has a configuration that is the same with or similar to that of the linear drive motor 80 applied to the automotive transmission 1. For example, the length of the coil 860 may be reduced by about 1 mm to create a distance of about 1 mm between the end of the coil 860 and the other surface of the first cover unit 812.

In addition, the curve G-d represents a transition in the propulsive force of a modified linear drive motor having a configuration the same with or similar to that of the linear drive motor 80 applied to the automotive transmission 1. The length of the coil 860 may be reduced by about 2 mm to create a distance of about 2 mm between the end of the coil 860 and the other surface of the first cover unit 812. The curves G-e to G-g represent transitions in the propulsive force of modified linear drive motors that have configurations the same or similar to the configuration of the linear drive motor 80 applied to the automotive transmission 1. The lengths of the coil 860 may be reduced by about 3 mm, by about 4 mm and by about 5 mm to create distances of about 3 mm, about 4 mm and about 5 mm between the end of the coil 860 and the other surface of the first cover unit 812, respectively. As shown, the linear drive motor 80 applied to the automotive transmission 1 according to an exemplary embodiment of the present invention demonstrated a markedly increased propulsive force, compared to the conventional VCM.

Additionally, as the distance between the end of the coil 860 and the other surface of the first cover unit 812 increases and gradually reduces the length of the coil 860, a portion of the end of the coil 860 deviates from its portion that overlaps with the magnet 820 to then overlap with the second cover unit 813 may be reduced, the propulsive force was rather increased from the starting time of the effective distance. However, when the length of the coil 860 is reduced to increase a distance between the coil 860 and the first cover unit 812, the propulsive force may be further reduced at an ending portion of the effective distance. Therefore, the distance between the coil 860 and the first cover unit 812 may be adjusted to be about 1 mm to about 2 mm. When the overlapping portion between the coil 860 and the first cover unit 812 is reduced by a predetermined distance between the coil 860 and the first cover unit 812, the increased propulsive force was demonstrated from the starting time of the effective distance. Therefore, the automotive transmission 1 may provide a reaction force to implement shift blocking for restricting the manipulation of the knob 10 to prevent the knob 10 from being shifted from a particular gear position to another while the vehicle moves.

Figure 16:
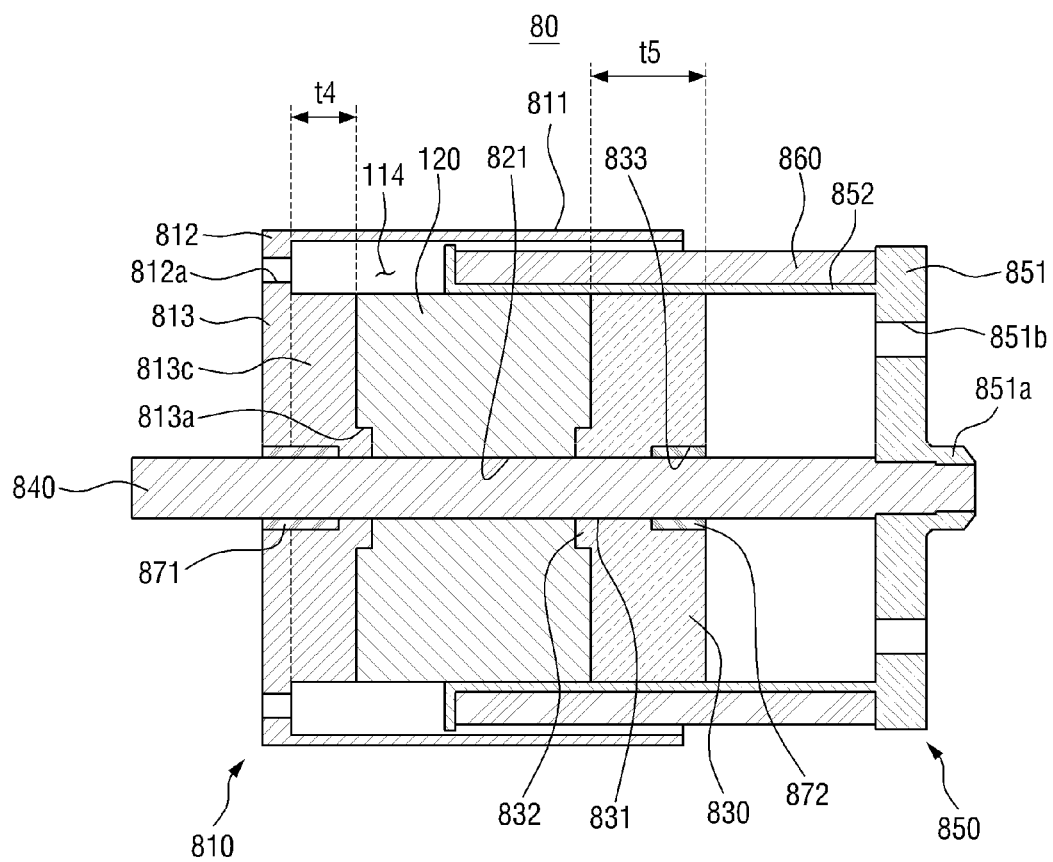
FIG. 16 is an exemplary cross-sectional view of a linear drive motor according to an exemplary embodiment of the present invention.

FIG. 16 is an exemplary cross-sectional view of a linear drive motor according to an exemplary embodiment. As shown in FIG. 16, the linear drive motor 80 may include a head component 810, a magnet 820, a first yoke 813c, a second yoke 830, a shaft 840, a bobbin 850, a coil 860 and bushes 871 and 872. As shown in FIG. 16, the linear drive motor 80 may include the first yoke 813c provided within the covers 812 and 813. The first yoke 813c may be formed to extend from the second cover unit 813 to an interior side of the head component 810. The first yoke 813c and the magnet 820 may be concentrically arranged, and a diameter of the first yoke 813c may correspond to a diameter of the magnet 820. The first yoke 813c may minimize leakage of magnetic fluxes by forming a magnetic flux distribution of the magnetic field formed by the magnet 820 to be substantially perpendicular to the magnet 820 and/or the coil 860. In an exemplary embodiment, the first yoke 813c and the second cover unit 813 may be integrally formed, which is, however, provided for illustration. Rather, the first yoke 813c and the second cover unit 813 may exist as separate components. The covers 812 and 813 and the first yoke 813c may be made of S45C carbon steel, permalloy, an amorphous metal alloy, an oriented electromagnetic steel sheet, a non-oriented electromagnetic steel sheet, pure iron, or the like.

As shown in FIG. 16, the second yoke 830 may be disposed on the second surface (e.g., other surface) of the magnet 820. The second yoke 830 minimizes unnecessary leakage of magnetic fluxes by forming a magnetic flux distribution of the magnetic field formed by the magnet 820 to be substantially perpendicular to the magnet 820 and/or the coil 860. The second yoke 830 may be made of S45C carbon steel, permalloy, an amorphous metal alloy, an oriented electromagnetic steel sheet, a non-oriented electromagnetic steel sheet, pure iron, or the like, and may be formed using the same material with the first yoke 813c and/or the covers 812 and 813.

In the present embodiment, the magnet 820 may be disposed within the head component 810 and the coil 860 may be mounted on the bobbin 850, which is, however, provided for illustration. Rather, the magnet 820 may be disposed within the bobbin 850 and the coil 860 may be mounted on the head component 810. As shown in FIG. 16, the first yoke 813c, the magnet 820 and the second yoke 830 820 may be concentrically arranged to have substantially the same diameter, so that they are maintained to be spaced a predetermined distance apart from the sidewall 811. As shown in FIG. 16, in the linear drive motor 80 may have a thickness t5 of the second yoke 830 greater than a thickness t4 of the first yoke 813c. The thickness t4 of the first yoke 813c and the thickness t5 of the second yoke 830 may correspond to axial lengths of the shaft 840. In the linear drive motor 80, the thickness t5 of the second yoke 830 may be greater than the thickness t4 of the first yoke 813c, and the propulsive force of the linear drive motor 80 may be increased, which will now be described in detail with reference to FIGS. 17 to 19.

Figure 17:
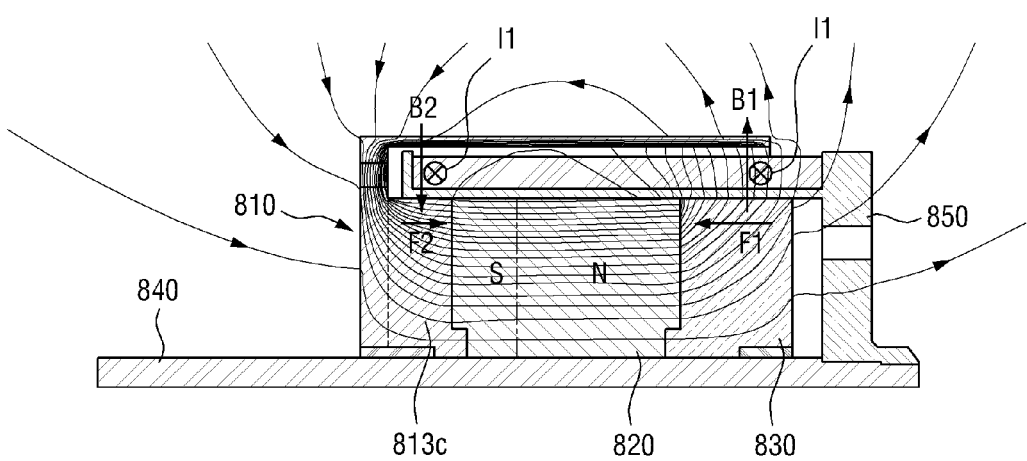
FIGS. 17 to 19 are exemplary views illustrating a transition in the propulsive force depending on the operation of the linear drive motor according to an exemplary embodiment of the present invention.
Figure 18:
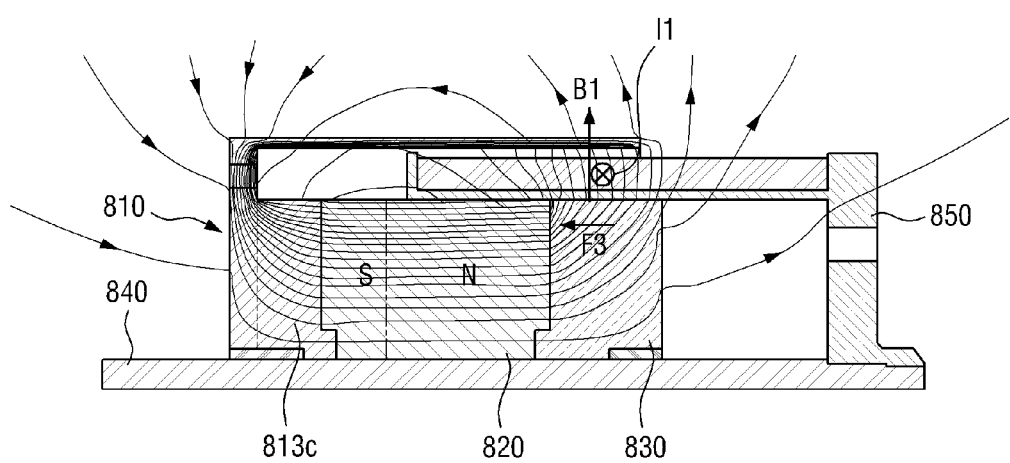
Figure 19:
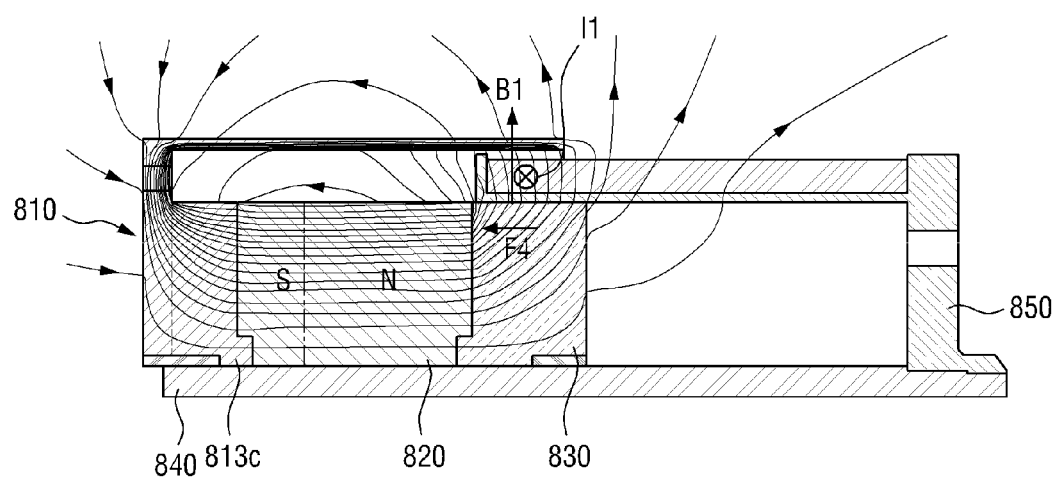

FIGS. 17 to 19 are exemplary views illustrating a transition in the propulsive force based on the operation of the linear drive motor according to an exemplary embodiment. As shown in FIGS. 17 to 19, in the linear drive motor 80 according to an exemplar embodiment, the head component 810, the magnet 820, the first yoke 813 and the second yoke 830 may move together relative to the bobbin 850 and the coil 860 within a given distance range. The head component 810, the magnet 820, the first yoke 813 and the second yoke 830 may move forward or backward based on the direction of the current flowing in the coil 860. As confirmed from FIGS. 17 to 19, the shortest moving distance of the head component 810 is shown in FIG. 17, and the moving distance of the head component 810 may gradually increased in the order of the states shown in FIGS. 18 and 19.

As shown in FIG. 17, the magnet 820 may be placed such that its one end being in contact with the first yoke 813c becomes an S pole and the other end being in contact with the second yoke 830 becomes an N pole. Therefore, a magnetic force distribution may be formed in a substantially counterclockwise direction, when viewed from FIG. 17. In order to move the head component 810 in one direction (in the left direction of FIG. 17), the current (I1) may flow in the counterclockwise direction, when the bobbin 850 is viewed from the covers 812 and 813. In a region adjacent to the second yoke 830, as shown in FIG. 17, a magnetic field (B1) may be formed in a direction that extends from the second yoke 830 to the coil 860 and the current (I1) flows in the counterclockwise direction, so that an electromagnetic force F1 applied in the one direction acts on the second yoke 830.

Additionally, in a region adjacent to the first yoke 813c, as shown in FIG. 17, a magnetic field (B2) may be formed in a direction that extends from the coil 860 to the first yoke 813c and the current (I1) flows in the counterclockwise direction, therefore an electromagnetic force F2 applied in the opposite direction acts on the first yoke 813c. The electromagnetic force F1 that acts on the second yoke 830 may be a forward force that moves the head component 810, while the electromagnetic force F2 acts on the first yoke 813c may be a reverse force that moves the head component 810. Therefore, at an initial start of the vehicle, the head component 810 may reduce a propulsive force by the electromagnetic force F2 that acts on the first yoke 813c.

Accordingly, the linear drive motor 80 of the present embodiment may be configured to have the thickness t4 of the first yoke 813c less than the thickness t5 of the second yoke 830 and the thickness t5 of the second yoke 830 may be greater than the thickness t4 of the first yoke 813c. The electromagnetic force F2 generated in the reverse direction to the propulsive force and increases the electromagnetic force F1 generated in the forward direction to the propulsive force, compared to the conventional linear drive motor. In addition, since the thickness t5 of the second yoke 830 may be greater than the thickness t4 of the first yoke 813c, as shown in FIG. 17, the magnet 820 may have an asymmetric magnetization distribution in which the N pole has a wider polar distribution than the S pole. As the magnet 820 has the asymmetric magnetization distribution in which the N pole has a relatively wide polar distribution, as shown in FIG. 17, the magnetic field (B1) facing an exterior side of the head component 810 that generates the electromagnetic force F1 in the forward direction to the propulsive force is formed in a wider region, thereby increasing the electromagnetic force F1 generated in the forward direction to the propulsive force. Conversely, since the S pole has a relatively narrow polar distribution, the electromagnetic force F2 generated in the reverse direction to the propulsive force may be decreased.

As shown in FIG. 18, when the head component 810 advances in one direction farther in the state shown in FIG. 18 than in the state shown in FIG. 17, the electromagnetic force generated in the reverse direction to the propulsive force may be reduced unless the first yoke 813c and the S pole region of the magnet 820 overlap with the coil 860, and the electromagnetic force F3 generated in the forward direction to the propulsive force acts as the propulsive force. Therefore, the linear drive motor 80 demonstrates a larger propulsive force in the state shown in FIG. 18 than in the state shown in FIG. 17.

Furthermore, as shown in FIG. 19, when the head component 810 advances in one direction farther in the state shown in FIG. 18 than in the state shown in FIG. 17 so that a significant portion of the N pole region of the magnet 820 does not overlap with the coil 860, the magnetic field (B1) that faces the exterior side of the head component 810 generates an electromagnetic force F4 in the forward direction to the propulsive force may be formed in a narrower region. Accordingly, the electromagnetic force F4 generated in the forward direction to the propulsive force may be reduced, compared to the electromagnetic force F3 generated in the state shown in FIG. 18. Therefore, the linear drive motor 80 demonstrates a reduced propulsive force in the state shown in FIG. 19 than shown in FIG. 18 and the propulsive force gradually decreases as the head component 810 advances farther in one direction.

Figure 20:
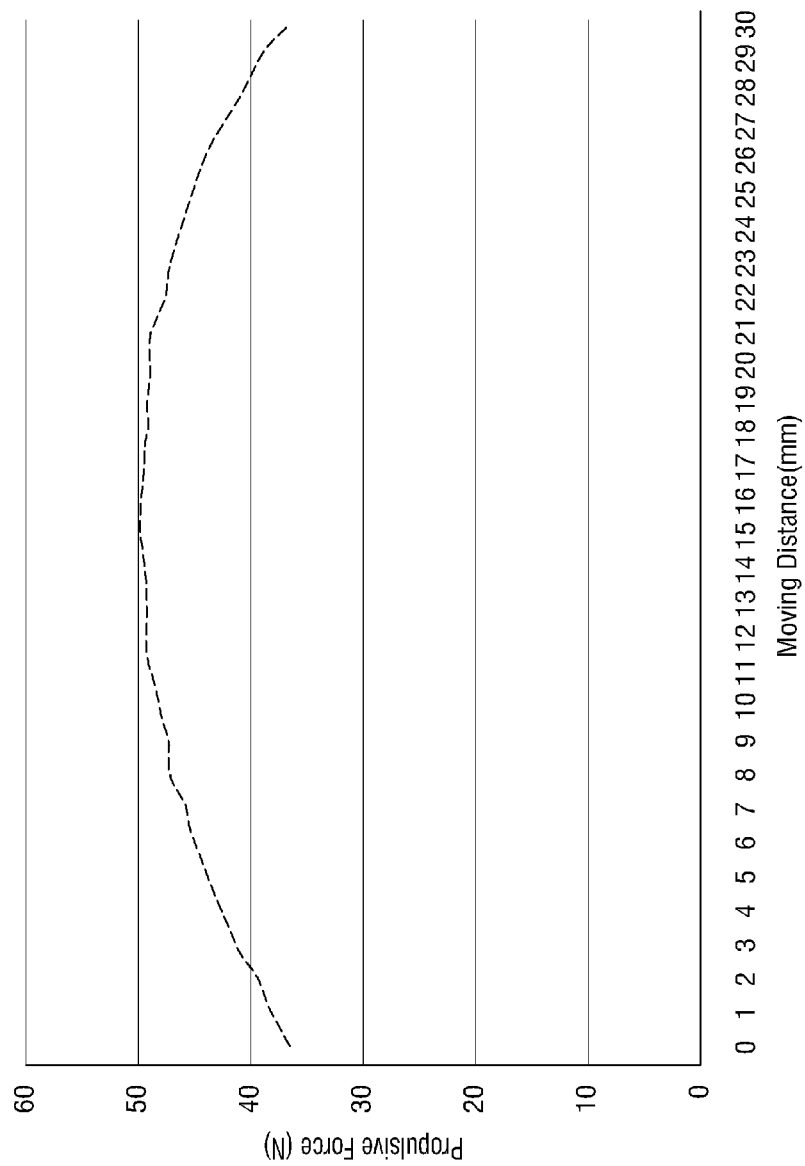
FIG. 20 is an exemplary graph illustrating a propulsive force of the linear drive motor according to an exemplary embodiment of the present invention.

FIG. 20 is an exemplary graph illustrating a propulsive force of the linear drive motor according to an exemplary embodiment of the present invention. Therefore, the linear drive motor 80 demonstrates the propulsive force varies as shown in FIG. 20. As described above, in an initial movement stage of the head component 810 (being in the state shown in FIG. 17), the propulsive force may be reduced by the electromagnetic force F2 generated in the forward direction to the propulsive force. Thereafter, at a mid-moving stage of the head component 810 (being in the state shown in FIG. 18), the electromagnetic force generated in the forward direction to the propulsive force may be further reduced (e.g., nearly vanishes), so that the propulsive force gradually increases. Afterwards, in a later-moving stage of the head component 810 (being in the state shown in FIG. 19), the magnetic field (B1) faces the exterior side of the head component 810 that generates the electromagnetic force F4 in the forward direction to the propulsive force may be formed in a narrower region, thereby gradually decreasing the propulsive force.

Figure 21:
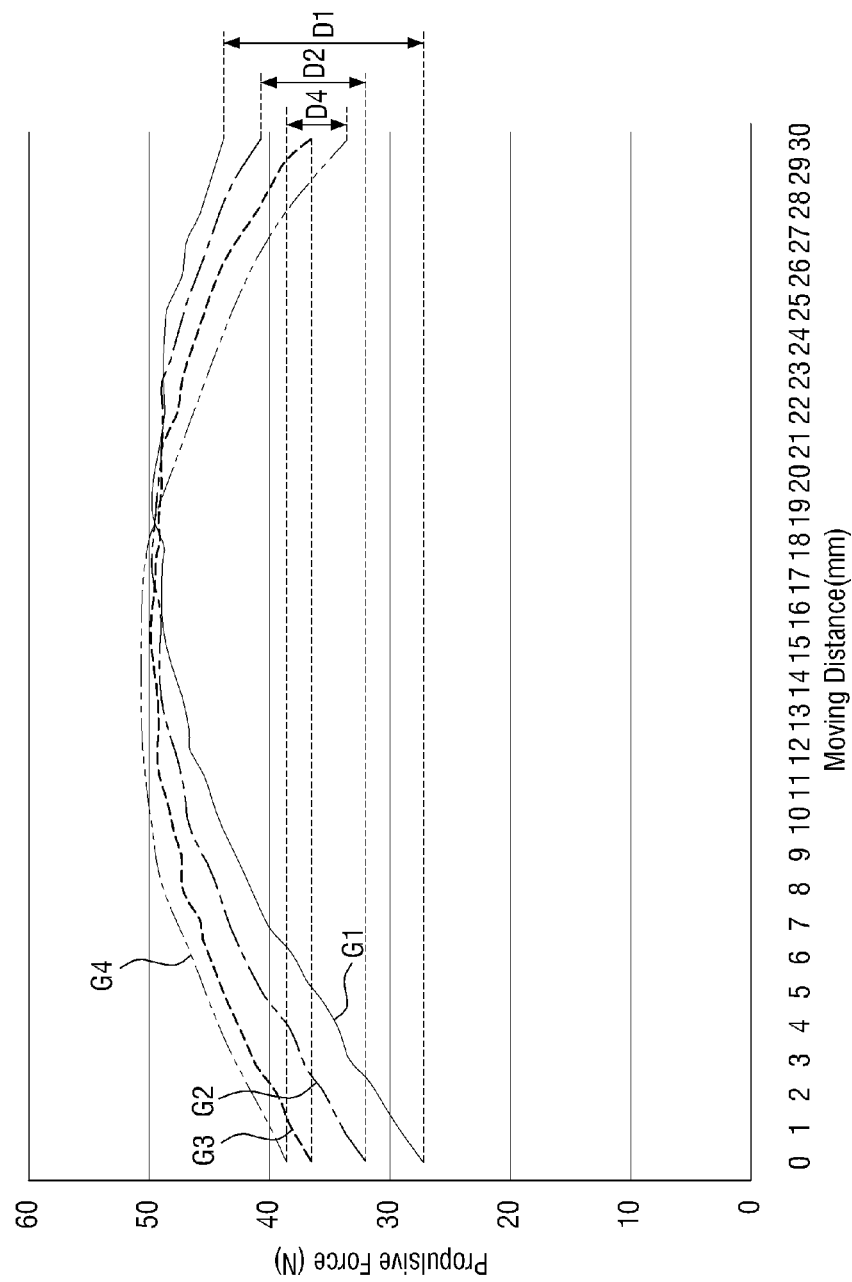
FIGS. 21 and 22 are exemplary graphs illustrating a propulsive force of a linear drive motor according to comparative experimental examples.
Figure 22:
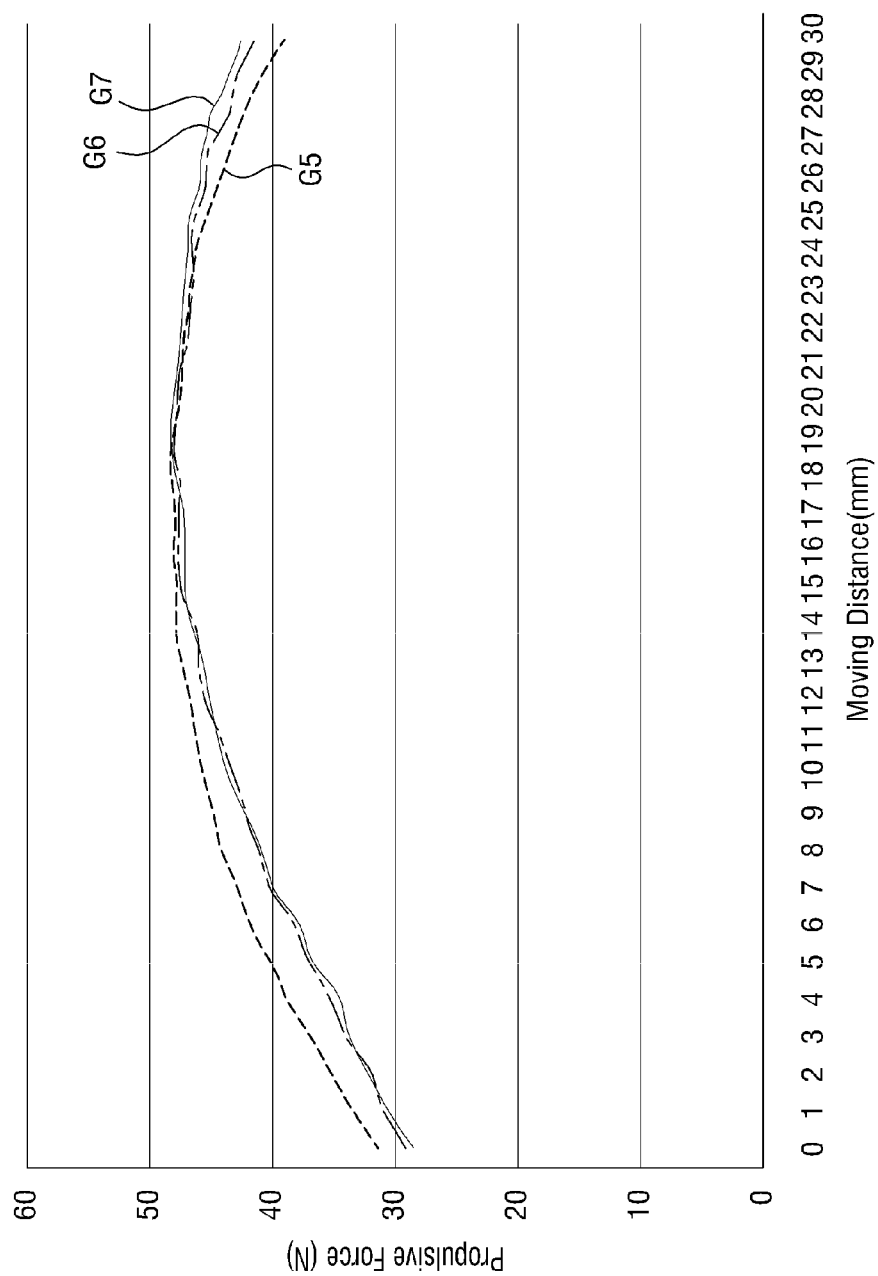

FIGS. 21 and 22 are exemplary graphs illustrating a propulsive force of a linear drive motor according to comparative experimental examples. Specifically, FIG. 21 is an exemplary graph illustrating a propulsive force of a linear drive motor through comparative experiments carried out while maintaining the thickness of the second yoke 830 and varying the thickness of the first yoke 813c. In FIG. 21, the curve G1 (solid line) represents the propulsive force of the conventional linear drive motor configured to have the first yoke 813c and the second yoke 830 with a substantially similar thickness, that may be about, 10 mm. The curve G2 (dash-dotted line) represents the propulsive force of the linear drive motor configured to have the first yoke 813c and the second yoke 830 with a thicknesses of about 8 mm and about 10 mm, respectively. The curve G3 (dotted line) represents the propulsive force of the linear drive motor configured to have the first yoke 813c and the second yoke 830 with a thicknesses of about 6 mm and about 10 mm, respectively. The curve G4 (dash-double dotted line) represents the propulsive force of the linear drive motor configured to have the first yoke 813c and the second yoke 830 with a thicknesses of about 4 mm and about 10 mm, respectively.

As confirmed from the graphical representations G1, G2, G3 and G4, when the thickness of the first yoke 813c decreases, the propulsive force is increased in the initial movement stage. In addition, as confirmed from the graphical representations G1, G2, G3 and G4, when the thickness of the first yoke 813c decreases, the propulsive force deviations D1 and D2 in the initial and later movement stages of the head component 810 gradually decrease. In particular, in the curve G3 that represents the propulsive force of the linear drive motor that have the first yoke 813c and the second yoke 830 with a thicknesses of about 6 mm and about 10 mm, respectively, the head component 810 demonstrates substantially the same propulsive force in the initial and later movement stages of the head component 810. However, in the curve G4 that represents the propulsive force of the linear drive motor configured to have the first yoke 813c and the second yoke 830 with thicknesses of about 4 mm and about 10 mm, respectively, the initial propulsive force was greater than that in the curve G3 but the later propulsive force was reduced until the initial propulsive force and the later propulsive force were reversed, creating a propulsive force deviation D4.

FIG. 22 is an exemplary graph illustrating a propulsive force of a linear drive motor through comparative experiments carried out while maintaining the thickness of the first yoke 813c and varying the thickness of the second yoke 830. In FIG. 22, the curve G5 (dotted line) represents the propulsive force of the conventional linear drive motor configured to have the first yoke 813c and the second yoke 830 with a thicknesses of about 10 mm and about 14 mm, respectively. The curve G6 (dash-dotted line) represents the propulsive force of the linear drive motor configured to have the first yoke 813c and the second yoke 830 with thicknesses of about 10 mm and about 8 mm, respectively. The G7 (solid line) represents the propulsive force of the linear drive motor configured to have the first yoke 813c and the second yoke 830 with a thicknesses of about 10 mm and about 6 mm, respectively. As confirmed from the graphical representations G5, G6 and G7, when the thickness of the thickness of the second yoke 830 is greater than that of the first yoke 813c, as represented by the curve G5, the propulsive force is increased in the initial movement stage of the head component 810. Additionally, the propulsive force deviations in the initial and later movement stages of the head component 810, represented by the curve G5, were less than those in cases represented by the curves G6 and G7.

Figure 23:
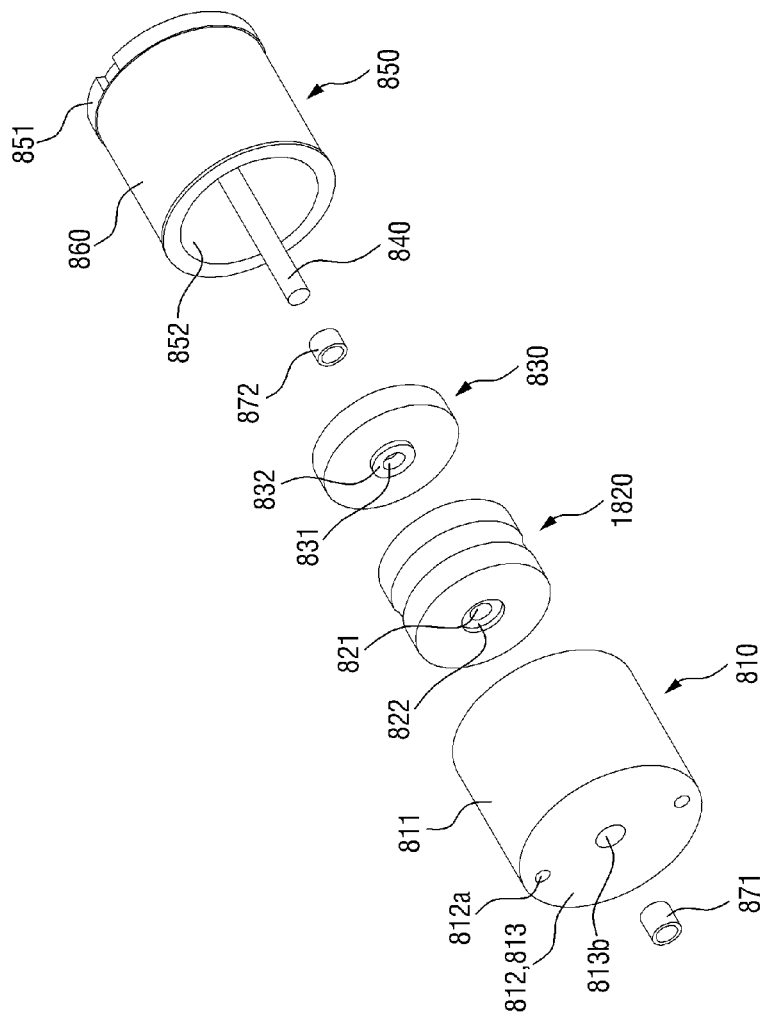
FIG. 23 is an exemplary exploded perspective view of the linear drive motor according to an exemplary embodiment of the present invention.
Figure 24:
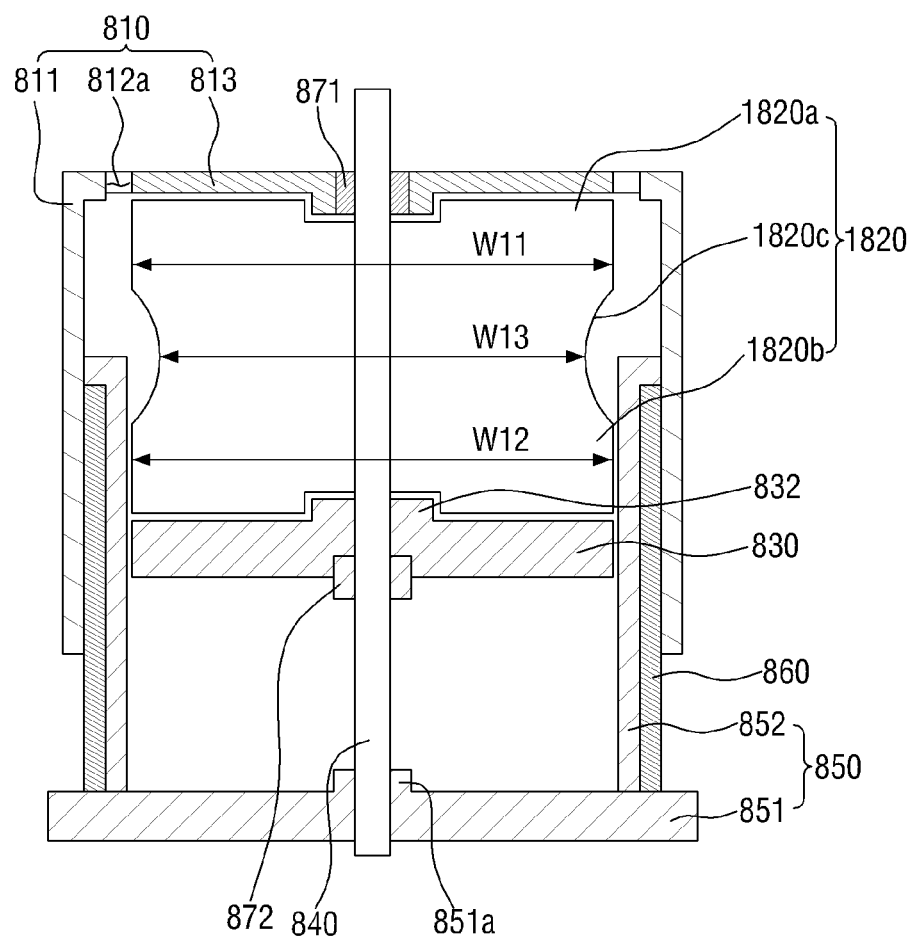
FIG. 24 is an exemplary cross-sectional view of the linear drive motor according to an exemplary embodiment of the present invention.
Figure 25:
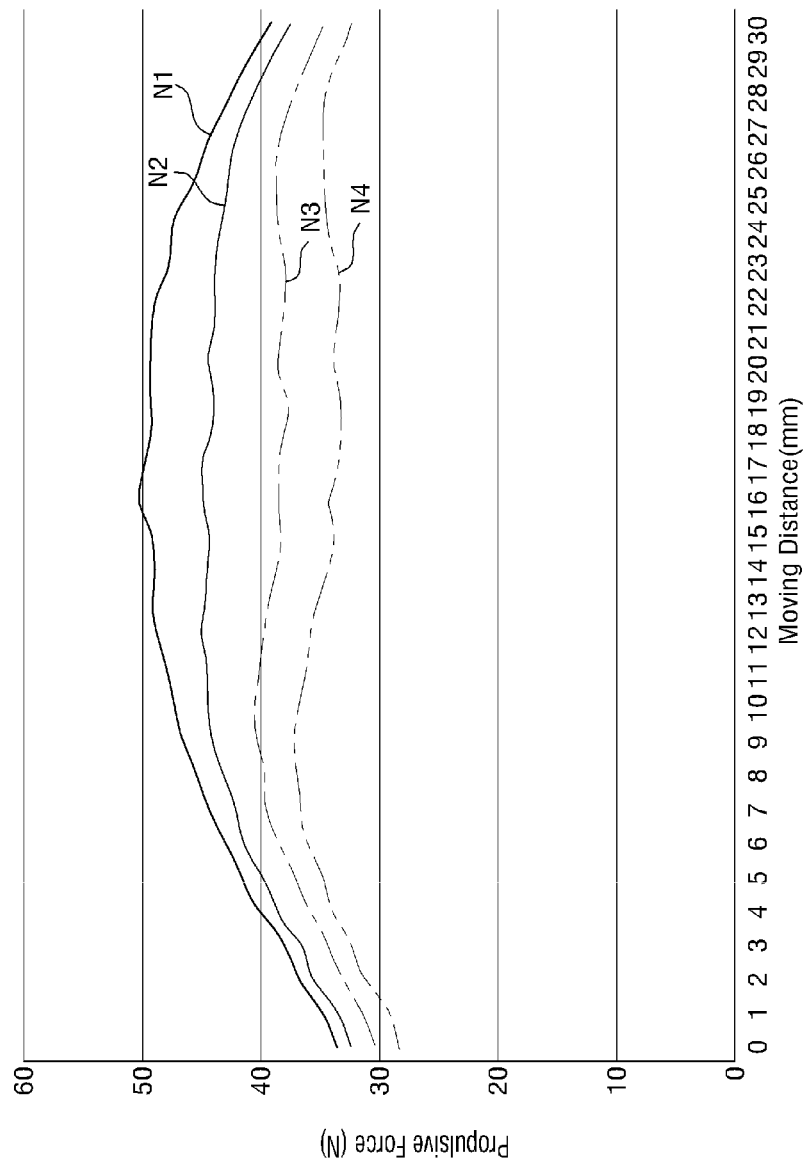
FIGS. 25 and 26 are exemplary graphs comparatively illustrating a propulsive force of the linear drive motor according to an exemplary embodiment of the present invention with a propulsive force of a conventional linear drive motor.
Figure 26:
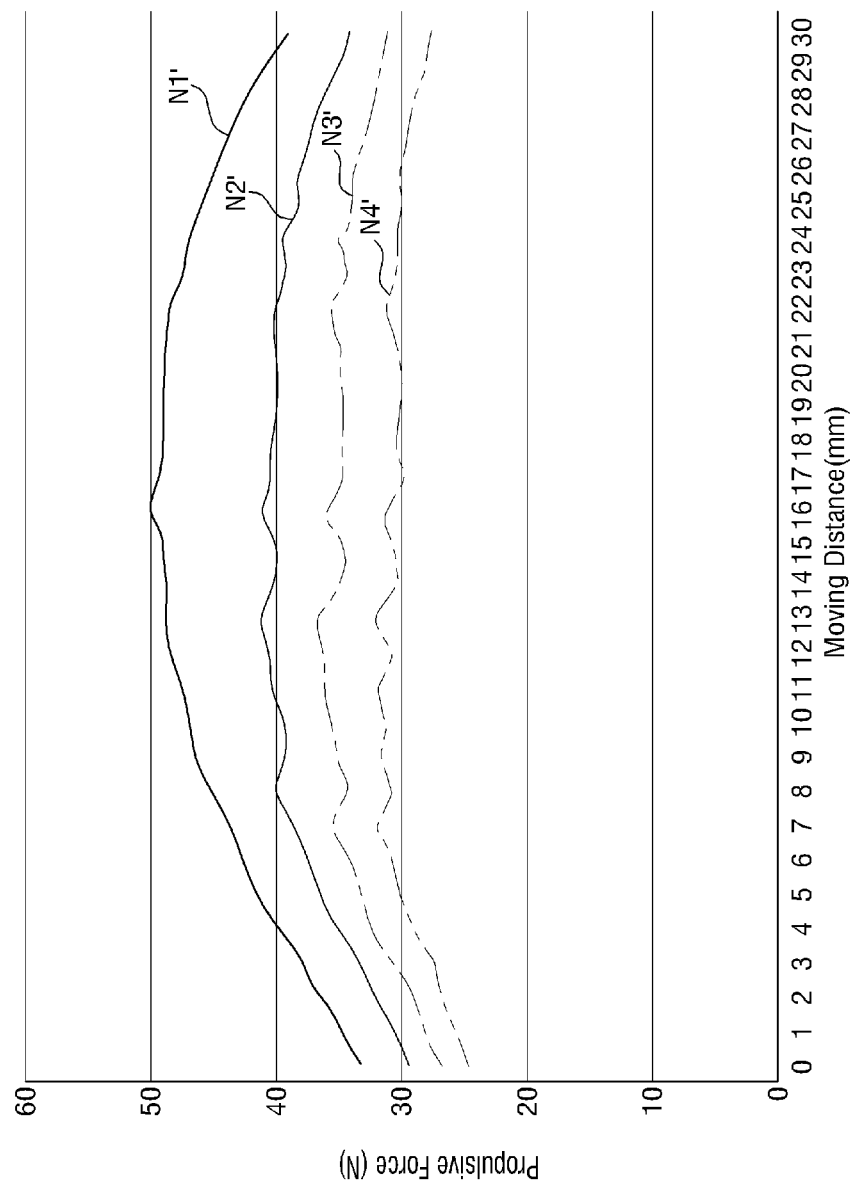

FIG. 23 is an exemplary exploded perspective view of the linear drive motor according to an exemplary embodiment. FIG. 24 is an exemplary cross-sectional view of the linear drive motor according to an exemplary embodiment. FIGS. 25 and 26 are exemplary graphs comparatively illustrating a propulsive force of the linear drive motor according to an exemplary embodiment with a propulsive force of a conventional linear drive motor.

As shown in FIGS. 23 and 24, in the linear drive motor according to an exemplary embodiment of the present invention, widths W11, W12 and W13 of a magnet 1820 may be consistently maintained from opposite surfaces of the magnet 1820 to a middle portion of the magnet 1820 to then decrease in the form of a parabolic curve. For example, diameters of the magnet 1820 that may have a substantially cylindrical shape may be consistently maintained from opposite surfaces of the magnet 1820 to the middle portion of the magnet 1820 to then decrease in the form of a parabolic curve. As shown in FIG. 24, the width W11 of a top portion 1820a of the magnet 1820 and the width W12 of a bottom portion 1820b of the magnet 1820 may be consistently maintained toward the middle portion of the magnet 1820. In addition, the width W11 of the top portion 1820a of the magnet 1820 and the width W12 of the bottom portion 1820b of the magnet 1820 may be equal to each other. The width of the middle portion 1820c of the magnet 1820 may gradually decrease toward the middle region 1820c from the top and bottom portions 1820a and 1820b in the form of the parabolic curve until it becomes equal to the width W13.

The linear drive motor 80 may generate a propulsive force by interaction between the magnet 1820 and the coil 860. The magnet 1820 may be displaced (e.g., moved) forward by the propulsive force. As the magnet 1820 disposed within the head component 810 may be moved forward, the head component 810 may also be moved forward. For example, when there is no interaction between the magnet 1820 and the coil 860, most of the magnet 1820 may be positioned within the interior of the coil 860. Accordingly, the coil 860 may be wound around a portion of the periphery of the magnet 1820. When an electromagnetic action occurs between the magnet 1820 and the coil 860 in the presence of current supplied to the coil 860, a propulsive force may move the magnet 1820 forward. Accordingly, the magnet 1820 may be displaced in a forward direction.

In FIG. 25, N1 indicates a propulsive force generated in the conventional cylindrical magnet having the constant width. As shown in FIG. 25, in the linear drive motor that uses the conventional cylindrical magnet, when a roughly middle portion of the magnet deviates from the interior of the coil, the maximum propulsive force is generated, and the propulsive force derived from the interaction between the magnet and the coil starts to decrease from a time when the middle portion of the magnet deviates from the interior of the coil magnet.

TABLE 1

| | Decreasing width of magnet | Length of width decreasing portion | Minimum propulsive force | Maximum propulsive force | Deviation of propulsive force | Remark |
|---|---|---|---|---|---|---|
| N1 | 0 mm | 0 mm | 33 N | 50 N | 17 N | |
| N2 | 2 mm | 16 mm | 32 N | 45 N | 13 N | |
| N3 | 4 mm | 16 mm | 30.5 N | 40 N | 9.5 N | |
| N4 | 6 mm | 16 mm | 29.5 N | 37 N | 7.5 N | |

As shown in FIG. 25 and Table 1, since the cylindrical magnet has a large propulsive force deviation, the propulsive forces giving the driver a shift manipulation feel based on the movement distance of the knob 10 during shifting may become non-uniform. For example, the propulsive force generated by the interaction between the conventional magnet and the coil may be about 33N to a minimum and about 50N to a maximum, and may provide a propulsive force deviation of about 17N. Here, the propulsive force deviation means a difference between the maximum propulsive force and the minimum propulsive force. By contrast, in the magnet 1820 configured such that a width W13 of at least a portion between its opposite surfaces may be less than widths W11 and W12 of the opposite surfaces, when the roughly middle portion of the magnet 1820 deviates from the interior of the coil 860, the propulsive force of the magnet 1820 decreases, compared to the conventional magnet. For example, a width W11 of a top portion 1820 of the magnet 1820 may be consistently maintained toward the middle portion of the magnet 1820. The propulsive force generated by the interaction between the magnet 1820 and the coil 860 may gradually increase. In addition, as the magnet 1820 moves forward by the gradually increase in propulsive force, the top portion of the magnet 1820 deviates from the interior of the coil 860.

As shown in FIG. 25, when the middle portion of the magnet 1820 has a width W13 less than the width W11 of the top portion and begins to deviate from the interior of the coil 860, the propulsive force derived from the interaction between the magnet 1820 and the coil 860 may gradually decrease or may be substantially constantly maintained. As shown in FIG. 25, since the magnet 1820 does not have a significant propulsive force deviation, the propulsive force that provides the driver with a shift manipulation feel based on the movement distance of the knob 10 during shifting may become substantially uniform.

In FIG. 25, N2 indicates a propulsive force generated when a length of the width-decreasing middle portion of the magnet 1820 is about 16 mm while a width (diameter) of the magnet 1820 may be reduced to about 2 mm. In FIG. 25, N3 indicates a propulsive force generated when a length of the width-decreasing middle portion of the magnet 1820 is about 16 mm while a width (diameter) of the magnet 1820 may be reduced to about 4 mm. In FIG. 25, N4 indicates a propulsive force generated when a length of the width-decreasing middle portion of the magnet 1820 is about 16 mm while a width (diameter) of the magnet 1820 may be reduced to about 6 mm. In other words, widths of the opposite surfaces of the magnet 1820 may be greater than 6 mm and may be equal to each other.

As shown in FIG. 25 and Table 1, when the length of the width-decreasing middle portion of the magnet 1820 is about 16 mm while the width W13 of the middle portion of the magnet 1820 is reduced to be about 2 mm smaller than the widths W11 and W12 of the top and bottom portions of the magnet 1820, the propulsive force generated by the interaction between the magnet 1820 and the coil 860 is about 32N to a minimum and about 45N to a maximum, and provides a propulsive force deviation of about 13N. As shown in FIG. 25 and Table 1, when the length of the width-decreasing middle portion of the magnet 1820 is about 16 mm while the width W13 of the middle portion of the magnet 1820 is reduced to be about 4 mm smaller than the widths W11 and W12 of the top and bottom portions of the magnet 1820, the propulsive force generated by the interaction between the magnet 1820 and the coil 860 is about 30.5N to a minimum and about 40N to a maximum, and provides a propulsive force deviation of about 9.5N.

As shown in FIG. 25 and Table 1, when the length of the width-decreasing middle portion of the magnet 1820 is about 16 mm while the width W13 of the middle portion of the magnet 1820 is reduced to be about 6 mm smaller than the widths W11 and W12 of the top and bottom portions of the magnet 1820, the propulsive force generated by the interaction between the magnet 1820 and the coil 860 is about 29.5N to a minimum and about 37N to a maximum, and provides a propulsive force deviation of about 7.5N. In other words, the propulsive force generated by the interaction between the magnet 1820 and the coil 860, a difference between the maximum propulsive force and the minimum propulsive force may be reduced as the length of the width decreasing portion of the magnet 1820 increases. In addition, the width W13 of the middle portion of the magnet 1820 may be reduced to a greater extent, the maximum propulsive force and the minimum propulsive force derived from the interaction between the magnet 1820 and the coil 860 may also be reduced. Therefore, as the width W13 of the middle portion of the magnet 1820 becomes less than the widths W11 and W12 of the top and bottom portions of the magnet 1820, the propulsive forces that provides the driver a shift manipulation feel based on the moving distance of the knob 10 during shifting may be more uniformly generated.

TABLE 2

| | Decreasing width of magnet | Length of width decreasing portion | Minimum propulsive force | Maximum propulsive force | Deviation of propulsive force | Remark |
|---|---|---|---|---|---|---|
| N1' | 0 mm | 0 mm | 33 N | 50 N | 17 N | |
| N2' | 2 mm | 25 mm | 29.5 N | 41 N | 12.5 N | |
| N3' | 4 mm | 25 mm | 26.5 N | 37 N | 9.5 N | |
| N4' | 6 mm | 25 mm | 24.5 N | 31.5 N | N | |

In FIG. 26, NT indicates a propulsive force generated when a length of the width-decreasing middle portion of the magnet 1820 is about 25 mm while a width (diameter) of the magnet 1820 is reduced to about 2 mm. In FIG. 26, NY indicates a propulsive force generated when a length of the width-decreasing middle portion of the magnet 1820 is about 16 mm while a width (diameter) of the magnet 1820 is reduced to about 4 mm. In FIG. 26, N4' indicates a propulsive force generated when a length of the width-decreasing middle portion of the magnet 1820 is about 16 mm while a width (diameter) of the magnet 1820 is reduced to about 6 mm. In particular, widths of opposite surfaces of the magnet 1820 may be greater than 6 mm and may be equal to each other.

As shown in FIG. 26 and Table 2, when the length of the width-decreasing middle portion of the magnet 1820 is about 25 mm while the width W13 of the middle portion of the magnet 1820 is reduced to be to about 2 mm less than the widths W11 and W12 of the top and bottom portions of the magnet 1820, the propulsive force generated by the interaction between the magnet 1820 and the coil 860 is about 29.5N to a minimum and about 41N to a maximum, and provides a propulsive force deviation of about 12.5N. As shown in FIG. 26 and Table 2, when the length of the width-decreasing middle portion of the magnet 1820 is about 25 mm while the width W13 of the middle portion of the magnet 1820 is reduced to be about 4 mm smaller than the widths W11 and W12 of the top and bottom portions of the magnet 1820, the propulsive force generated by the interaction between the magnet 1820 and the coil 860 is about 26.5N to a minimum and about 37N to a maximum, and provides a propulsive force deviation of about 9.5N. As shown in FIG. 26 and Table 2, when the length of the width-decreasing middle portion of the magnet 1820 is about 20 mm while the width W13 of the middle portion of the magnet 1820 is reduced to be about 6 mm smaller than the widths W11 and W12 of the top and bottom portions of the magnet 1820, the propulsive force generated by the interaction between the magnet 1820 and the coil 860 is about 24.5N to a minimum and about 31.5N to a maximum, and provides a propulsive force deviation of about 7N.

As described above with reference to FIGS. 25 and 26 and Tables 1 and 2, in terms of the propulsive force generated by the interaction between the magnet 1820 and the coil 860, a difference between the maximum propulsive force and the minimum propulsive force may be reduced as the length of the width decreasing portion of the magnet 1820 increases. Additionally, as the width W13 of the middle portion of the magnet 1820 may be reduced, the maximum propulsive force and the minimum propulsive force derived from the interaction between the magnet 1820 and the coil 860 may also be reduced. Further, as the length of the width decreasing portion of the magnet 1820 increases, the maximum propulsive force and the minimum propulsive force derived from the interaction between the magnet 1820 and the coil 860 may also be reduced. Accordingly, as the length of the width decreasing portion of the magnet 1820 increases, the overall propulsive force may also be reduced.

In the magnet 1820 configured to have a width of at least a portion between opposite surfaces smaller than widths of the opposite surfaces, the propulsive force of the magnet 1820 derived from the interaction between the magnet 1820 and the coil 860 may be generated more uniformly than the magnet that has a constant width. In some cases, however, the propulsive force of the magnet 1820 may not become nearly non-uniform. Therefore, the propulsive force of the magnet 1820 derived from the interaction between the magnet 1820 and the coil 860 may be adjusted to be nearly uniform by controlling the current applied to the coil 860. In other words, the magnet 1820 may be configured to appear to have a substantially U-shaped groove inwardly formed along the periphery of the magnet 1820. Accordingly, as shown in FIG. 24, the magnet 1820 may be formed to have a substantially I-shaped cross section in a direction perpendicular to its width (diameter). In addition, the magnet 1820 may be symmetrically formed with respect to the motor shaft 840 that passes through the center of the magnet 1820.

Figure 27:
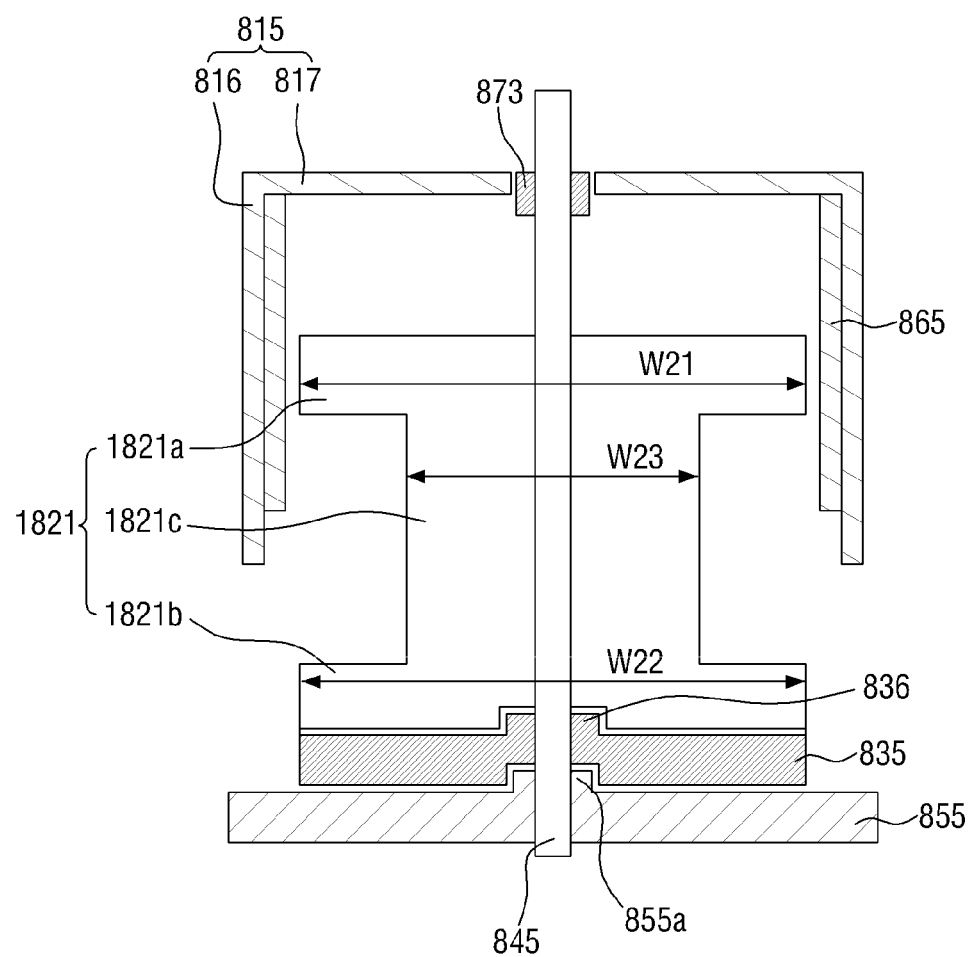
FIG. 27 is an exemplary longitudinal cross-sectional view of the linear drive motor according to exemplary embodiment of the present invention.

FIG. 27 is an exemplary longitudinal cross-sectional view of the linear drive motor according to exemplary embodiment. In the exemplary embodiment shown in FIG. 27, rear components 1821, 835 and 855 may be defined by a bobbin 835, a magnet 1821 that has a width of at least a portion between opposite surfaces mounted on a top portion of the bobbin 835 less than the widths of the opposite surfaces, and a yoke 855. Additionally, a coil 865 that moves linearly by an interaction with the magnet 1821 may be disposed (e.g., mounted) within a head component 815. Therefore, the lever (40 of FIG. 4) may move linearly by the coil 865 disposed within the head component 815 installed to be movable relative to the rear components 1821, 835 and 855 to move the knob 10 or to provide a reaction force for manipulating the knob 10.

In the linear drive motor according to an exemplary embodiment, widths W21, W22 and W23 of the magnet 1821 may be consistently maintained from opposite surfaces to a middle portion of the magnet 1821 and the width W23 of the middle portion of the magnet 1821 may be consistently maintained. As shown in FIG. 27, a width W21 of a top portion 1821a of the magnet 1821 and a width W22 of a bottom portion 1821b of the magnet 1821 may be consistently maintained toward the middle portion of the magnet 1821. In addition, the width W21 of the middle portion 1821c of the magnet 1821 may be less than the widths W21 and W22 of the top and bottom portions 1821a and 1821b of the magnet 1821. In addition, the width W21 of the middle portion 1821c of the magnet 1821 may be consistently maintained. Accordingly, the top portion 1821a and the middle portion 1821c of the magnet 1821 may be stepped with respect to each other, and the bottom portion 1821b and the middle portion 1821c of the magnet 1821 may also be stepped with respect to each other. In other words, the magnet 1821 may be configured to appear to have a substantially U-shaped groove inwardly formed along the periphery of the magnet 1821. Accordingly, as shown in FIG. 27, the magnet 1821 may be formed to have a substantially I-shaped cross section in a direction perpendicular to its width (diameter). In addition, the magnet 1821 may be symmetrically formed with respect to the motor shaft 845 that passes through the center of the magnet 1821.

Figure 28:
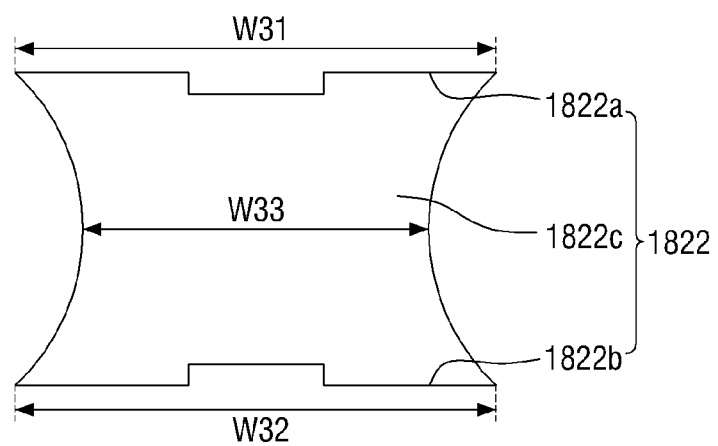
FIGS. 28 and 29 are exemplary views illustrating shapes of magnets of linear drive motors according to an exemplary embodiment of the present invention.
Figure 29:
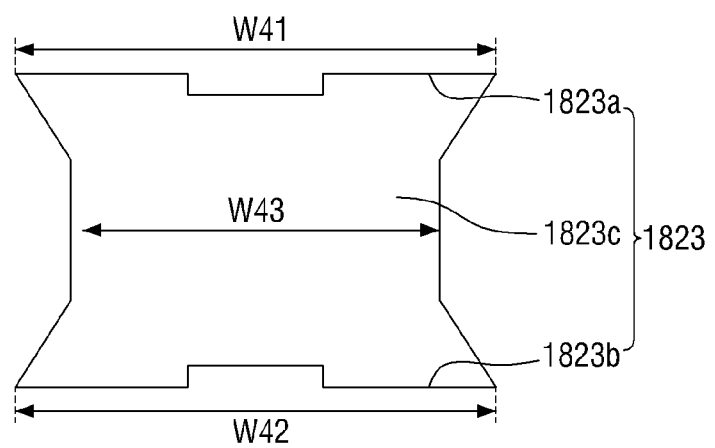

FIGS. 28 and 29 are exemplary views illustrating shapes of magnets of linear drive motors according to an exemplary embodiment. As shown in FIG. 28, diameters of the magnet 1822 may decrease in the form of a parabolic curve in which a decreasing ratio of the diameter may be reduced from opposite surfaces to a middle portion of the magnet 1822. In other words, a width W31 of a top portion 1822a of the magnet 1822 and a width W32 of a bottom portion 1822b of the magnet 1822 decrease toward the middle portion of the magnet 1822 in the form of a curve. However, in linear drive motors, the width W31 of the top portion 1822a of the magnet 1822 and the width W32 of the bottom portion 1822b of the magnet 1822 may decrease toward the middle portion 1822c of the magnet 1822 in the form of a line. The widths W31 and W32 of the top and bottom portions 1822a and 1822b of the magnet 1822 may be greater than the width W33 of the middle portion 1822c of the magnet 1822. In other words, the magnet 1822 may be configured to appear to have a substantially U-shaped groove inwardly formed along the periphery of the magnet 1822. Accordingly, as shown in FIG. 28, the magnet 1822 may be formed to have a substantially I-shaped cross section in a direction perpendicular to its width (diameter). In addition, the magnet 1822 may be symmetrically formed with respect to a motor shaft (not shown) that passes through the center of the magnet 1822.

As shown in FIG. 29, in the linear drive motor according to an exemplary embodiment, a width of the magnet 1823 linearly decreases from opposite surfaces to a middle portion of the magnet 1823 and a width of the middle portion of the magnet 1823 may be consistently maintained. However, in linear drive motors, the width of the magnet 1823 may decrease toward the middle portion of the magnet 1823 in the form of a curve and the width of the middle portion of the magnet 1823 may be consistently maintained. For example, the diameter of the magnet 1823 decreases in a predetermined decreasing ratio from the opposite surfaces to the middle portion of the magnet 1823 and the width of the middle portion of the magnet 1823 may be consistently maintained. A width W41 of a top portion 1823a of the magnet 1823 and a width W42 of a bottom portion 1823b of the magnet 1823 linearly decrease toward the middle portion of the magnet 1823. However, in linear drive motors, the width W41 of the top portion 1823a of the magnet 1823 and the width W42 of the bottom portion 1823b of the magnet 1823 may also decrease from the opposite surfaces to the middle portion of the magnet 1823 in the form of a curve.

The width of the magnet 1823 decreasing toward the middle portion of the magnet 1823 may be consistently maintained at a width W43 of the middle portion 1823c of the magnet 1823. In other words, the magnet 1823 may appear to have a substantially U-shaped groove inwardly formed along the periphery of the magnet 1823. Accordingly, as shown in FIG. 29, the magnet 1823 may be formed to have a substantially I-shaped cross section in a direction perpendicular to its width (diameter). In addition, the magnet 1823 may be symmetrically formed with respect to a motor shaft (not shown) that passes through the center of the magnet 1823.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the exemplary embodiments be considered in all respects as illustrative and not restrictive, reference being made to the appended claims rather than the foregoing description to indicate the scope of the invention. It is intended to include all such changes and modifications insofar as they come within the scope of the appended claims or the equivalents thereof.

What is claimed is:

1. An automotive transmission comprising:
   a housing;
   a knob actuated by a driver;
   a lever that moves in linkage with the operation of the knob; and
   a linear drive motor configured to provide a reaction force against a force to displace the knob or a force for the driver to actuate the knob,
   wherein the linear drive motor comprises:
      a rear component fixedly disposed within the housing;
      a head component movably disposed with respect to the rear component, wherein the head component is connected to the lever and configured to move the lever;
      a magnet disposed within the head component and connected to the head component; and
      a coil disposed within the rear component,
      wherein the head component includes a sidewall having at least a portion that overlaps the rear component, and a cover that extends from an end of the sidewall to an interior side of the head component and has a first cover unit having a thickness greater than a thickness of the sidewall,
      wherein the cover includes a second cover unit that extends from the first cover unit to an interior side of the head component and has a thickness greater than the thickness of the first cover unit, and
      wherein the magnet is in direct contact with the second cover unit.

2. The automotive transmission of claim 1, wherein the first cover unit has a thickness about two times or greater than the thickness of the sidewall.

3. The automotive transmission of claim 2, wherein a thickness ratio of the first cover unit to the sidewall is about 3 to about 1.

4. The automotive transmission of claim 1, wherein a first surface of the second cover unit is coplanar with a first surface of the first cover unit, and a second surface of the second cover unit is stepped with respect to a second surface of the first cover unit and protrudes parallel to the sidewall.

5. The automotive transmission of claim 1, wherein the rear component includes a bobbin having the coil wound thereon, the bobbin includes a base plate coupled to the housing and a coil cylinder that extends from a first surface of the base plate and has the coil wound thereon, and a plurality of recesses formed on a second surface of the base plate recessed toward the first surface of the base plate.

6. The automotive transmission of claim 1, wherein the head component moves toward the rear component until the movement of the head component is restricted the coil is spaced a predetermined distance apart from the first cover unit.

7. The automotive transmission of claim 6, wherein the predetermined distance between the coil and the first cover unit is within a range of about 1 mm to about 2 mm.

8. The automotive transmission of claim 1, wherein the lever includes a pivoting component rotatably supported within the housing, a knob coupling component that extends from the pivoting component to a first side and coupled to the knob, and an extension component that extends from the pivoting component to a second side and having at least a portion curved.

9. The automotive transmission of claim 8, further comprising a link member having a first end coupled to the extension component to be rotatable and a second end coupled to the head component, and moves linearly with the head component and rotates the lever around the pivoting component.

10. The automotive transmission of claim 9, wherein the extension component includes a penetration aperture through which a link pivot shaft coupled to one end of the link member, and the automotive transmission further comprises an elastic member disposed between the penetration aperture and the link pivot shaft.

11. The automotive transmission of claim 1, wherein the linear drive motor includes a first yoke disposed at a first end of the magnet and having a first thickness, and a second yoke disposed at a second end of the magnet and having a second thickness greater than the first thickness.

12. The automotive transmission of claim 11, wherein the first yoke and the second yoke are concentrically arranged around the magnet.

13. The automotive transmission of claim 11, wherein the magnet has an asymmetric magnetization distribution in which a polarity of one of an N pole and an S pole, adjacent to the second yoke, has a wider polar distribution than that of the other pole adjacent to the first yoke.

14. The automotive transmission of claim 11, wherein the asymmetric magnetization distribution of the magnet increases a propulsive force of the head component such that an electromagnetic force generated by the polarity adjacent to the second yoke is greater than that generated by the polarity adjacent to the first yoke.

15. The automotive transmission of claim 1, wherein a width of at least a region between opposite surfaces of the magnet is less than a width between the opposite surfaces.

16. The automotive transmission of claim 15, wherein widths of the magnet are maintained from the opposite surfaces of the magnet to a middle portion of the magnet to then decrease in the form of a line or a curve.

17. The automotive transmission of claim 15, wherein the widths of the magnet are maintained from the opposite surfaces of the magnet to a middle portion of the magnet and the width of the middle portion is maintained.

18. The automotive transmission of claim 15, wherein the widths of the magnet decrease from the opposite surfaces of the magnet to a middle portion of the magnet in the form of a line or a curve.

19. An automotive transmission comprising:
   a housing;
   a knob actuated by a driver;
   a lever that moves in linkage with the operation of the knob, wherein the lever includes a pivoting component rotatably supported within the housing, a knob coupling component that extends from the pivoting component to a first side and coupled to the knob, and an extension component that extends from the pivoting component to a second side and having at least a portion curved;
   a linear drive motor configured to provide a reaction force against a force to displace the knob or a force for the driver to actuate the knob; and
   a link member having a first end coupled to the extension component of the lever to be rotatable and a second end coupled to the linear drive motor, and configured to move linearly with the linear drive motor and rotate the lever around the pivoting component,
   wherein the extension component includes a penetration aperture through which a link pivot shaft is coupled to one end of the link member,
   wherein an elastic member is disposed between the penetration aperture and the link pivot shaft, and
   wherein the linear drive motor comprises:
      a rear component fixedly disposed within the housing;
      a head component movably disposed with respect to the rear component, wherein the head component is connected to the lever and configured to move the lever;
      a magnet disposed within the head component and connected to the head component; and
      a coil disposed within the rear component,
   wherein the head component includes a sidewall having at least a portion that overlaps the rear component, and a cover that extends from an end of the sidewall to an interior side of the head component and has a first cover unit having a thickness greater than a thickness of the sidewall,
   wherein the cover includes a second cover unit that extends from the first cover unit to an interior side of the head component and has a thickness greater than the thickness of the first cover unit, and
   wherein the magnet is in direct contact with the second cover unit.

* * * * *